US 9,182,516 B2

United States Patent
Gray et al.

(10) Patent No.: US 9,182,516 B2
(45) Date of Patent: Nov. 10, 2015

(54) PERSONNEL SCREENING SYSTEM

(71) Applicant: Rapiscan Systems, Inc., Torrance, CA (US)

(72) Inventors: Stephen Gray, Salem, OR (US); Ronald Hughes, Garden Grove, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 14/047,604

(22) Filed: Oct. 7, 2013

(65) Prior Publication Data

US 2014/0133630 A1    May 15, 2014

Related U.S. Application Data

(63) Continuation of application No. 13/047,743, filed on Mar. 14, 2011, now Pat. No. 8,576,982, and a continuation-in-part of application No. 12/887,510, filed on Sep. 22, 2010, now abandoned, which is a (Continued)

(51) Int. Cl.
*G01V 5/00* (2006.01)

(52) U.S. Cl.
CPC ......... *G01V 5/0025* (2013.01); *Y10T 29/49117* (2015.01); *Y10T 29/49826* (2015.01)

(58) Field of Classification Search
CPC ........... G01V 5/0025; Y10T 29/49826; Y10T 29/49117; G01N 23/00
See application file for complete search history.

(56) References Cited

U.S. PATENT DOCUMENTS

| | | |
|---|---|---|
| 3,678,278 A | 7/1972 | Peil |
| 3,780,291 A | 12/1973 | Stein |
| 3,790,799 A | 2/1974 | Stein |
| 3,843,881 A | 10/1974 | Barton |
| 3,884,816 A | 5/1975 | Takahashi |
| RE28,544 E | 9/1975 | Stein |
| 3,919,467 A | 11/1975 | Peugeot |
| 3,924,064 A | 12/1975 | Nomura |
| 3,961,186 A | 6/1976 | Leunbach |
| 3,971,948 A | 7/1976 | Pfeiler |
| 3,990,175 A | 11/1976 | Conway |
| 4,008,400 A | 2/1977 | Brunnett |

(Continued)

FOREIGN PATENT DOCUMENTS

| | | |
|---|---|---|
| CN | 1715895 | 1/2006 |
| CN | 101071109 | 5/2010 |

(Continued)

OTHER PUBLICATIONS

ANSI, Radiation Safety for Personnel Security Screening Systems Using X-Rays, Apr. 3, 2002.

(Continued)

*Primary Examiner* — Courtney Thomas
(74) *Attorney, Agent, or Firm* — Novel IP

(57) ABSTRACT

The present specification discloses an inspection system for detecting objects being carried by a person. The inspection system is highly modular and capable of being assembled by a two person team using conventional tooling equipment. In one embodiment, the inspection system has three primary modules—two detection modules and one radiation source module—that can be readily attached and detached from each other or to a frame and connected to a signal processing system to provide for a quick set up and tear down process.

14 Claims, 19 Drawing Sheets

Related U.S. Application Data continuation of application No. 12/344,162, filed on Dec. 24, 2008, now Pat. No. 7,826,589, said application No. 13/047,743 is a continuation-in-part of application No. 12/849,987, filed on Aug. 4, 2010, now Pat. No. 8,135,112, which is a continuation of application No. 12/024,320, filed on Feb. 1, 2008, now Pat. No. 7,796,733.

(60) Provisional application No. 61/313,772, filed on Mar. 14, 2010, provisional application No. 61/423,585, filed on Dec. 15, 2010, provisional application No. 61/423,582, filed on Dec. 15, 2010, provisional application No. 61/423,586, filed on Dec. 15, 2010, provisional application No. 61/016,590, filed on Dec. 25, 2007, provisional application No. 60/887,798, filed on Feb. 1, 2007.

(56) References Cited

U.S. PATENT DOCUMENTS

| | | | |
|---|---|---|---|
| 4,020,346 | A | 4/1977 | Dennis |
| 4,031,545 | A | 6/1977 | Stein |
| 4,047,035 | A | 9/1977 | Dennhoven |
| 4,064,440 | A | 12/1977 | Roder |
| 4,070,576 | A | 1/1978 | Cobb |
| 4,107,532 | A | 8/1978 | Macovski |
| 4,112,301 | A | 9/1978 | Annis |
| 4,139,771 | A | 2/1979 | Dennhoven |
| 4,160,165 | A | 7/1979 | McCombs |
| 4,179,100 | A | 12/1979 | Sashin |
| 4,196,352 | A | 4/1980 | Berninger |
| 4,200,800 | A | 4/1980 | Swift |
| 4,228,353 | A | 10/1980 | Johnson |
| 4,228,357 | A | 10/1980 | Annis |
| 4,242,583 | A | 12/1980 | Annis |
| 4,242,588 | A | 12/1980 | Huang |
| 4,260,898 | A | 4/1981 | Annis |
| 4,298,800 | A | 11/1981 | Goldman |
| 4,303,830 | A | 12/1981 | Heinzelmann |
| 4,342,914 | A | 8/1982 | Bjorkholm |
| 4,349,739 | A | 9/1982 | Annis |
| 4,366,382 | A | 12/1982 | Kotowski |
| 4,366,576 | A | 12/1982 | Annis |
| 4,380,817 | A | 4/1983 | Harding |
| 4,389,729 | A | 6/1983 | Stein |
| 4,414,682 | A | 11/1983 | Annis |
| 4,422,177 | A | 12/1983 | Mastronardi |
| 4,426,721 | A | 1/1984 | Wang |
| 4,454,605 | A | 6/1984 | Delucia |
| 4,472,822 | A | 9/1984 | Swift |
| 4,503,332 | A | 3/1985 | Annis |
| 4,514,691 | A | 4/1985 | De |
| 4,525,854 | A | 6/1985 | Molbert |
| 4,535,245 | A | 8/1985 | Zonneveld |
| 4,549,307 | A | 10/1985 | Macovski |
| 4,578,806 | A | 3/1986 | Grass |
| 4,586,441 | A | 5/1986 | Zekich |
| 4,598,415 | A | 7/1986 | Luccio |
| 4,672,837 | A | 6/1987 | Cottrell |
| 4,692,937 | A | 9/1987 | Sashin |
| 4,711,994 | A | 12/1987 | Greenberg |
| 4,736,401 | A | 4/1988 | Donges |
| 4,745,631 | A | 5/1988 | Paolini |
| 4,756,015 | A | 7/1988 | Doenges |
| 4,759,047 | A | 7/1988 | Donges |
| 4,768,214 | A | 8/1988 | Bjorkholm |
| 4,783,794 | A | 11/1988 | Dietrich |
| 4,799,247 | A | 1/1989 | Annis |
| 4,807,637 | A | 2/1989 | Bjorkholm |
| 4,809,312 | A | 2/1989 | Annis |
| 4,817,121 | A | 3/1989 | Shimizu |
| 4,819,256 | A | 4/1989 | Annis |
| 4,821,023 | A | 4/1989 | Parks |
| 4,825,454 | A | 4/1989 | Annis |
| 4,839,913 | A | 6/1989 | Annis |
| 4,841,555 | A | 6/1989 | Doi |
| 4,845,769 | A | 7/1989 | Burstein |
| 4,864,142 | A | 9/1989 | Gomberg |
| 4,870,670 | A | 9/1989 | Geus |
| 4,884,289 | A | 11/1989 | Glockmann |
| 4,890,310 | A | 12/1989 | Umetani |
| 4,893,015 | A | 1/1990 | Kubierschky |
| 4,894,619 | A | 1/1990 | Leinonen |
| 4,899,283 | A | 2/1990 | Annis |
| 4,961,214 | A | 10/1990 | Van |
| 4,974,247 | A | 11/1990 | Friddell |
| 4,979,137 | A | 12/1990 | Gerstenfeld |
| 4,995,066 | A | 2/1991 | Harding |
| 5,007,072 | A | 4/1991 | Jenkins |
| 5,022,062 | A | 6/1991 | Annis |
| 5,033,073 | A | 7/1991 | Friddell |
| 5,038,370 | A | 8/1991 | Harding |
| 5,039,981 | A | 8/1991 | Rodriguez |
| 5,044,002 | A | 8/1991 | Stein |
| 5,084,619 | A | 1/1992 | Pfeiler |
| 5,115,459 | A | 5/1992 | Bertozzi |
| 5,120,706 | A | 6/1992 | Weeks |
| 5,121,105 | A | 6/1992 | Aittoniemi |
| 5,127,030 | A | 6/1992 | Annis |
| 5,132,995 | A | 7/1992 | Stein |
| 5,156,270 | A | 10/1992 | Kachel |
| 5,179,581 | A | 1/1993 | Annis |
| 5,181,234 | A | 1/1993 | Smith |
| 5,182,764 | A | 1/1993 | Peschmann |
| 5,212,720 | A | 5/1993 | Landi |
| 5,224,144 | A | 6/1993 | Annis |
| 5,243,693 | A | 9/1993 | Maron |
| 5,247,561 | A | 9/1993 | Kotowski |
| 5,253,283 | A | 10/1993 | Annis |
| 5,260,982 | A | 11/1993 | Fujii |
| 5,313,511 | A | 5/1994 | Annis |
| 5,367,552 | A | 11/1994 | Peschmann |
| 5,394,454 | A | 2/1995 | Harding |
| 5,397,986 | A | 3/1995 | Conway |
| 5,420,905 | A | 5/1995 | Bertozzi |
| 5,430,787 | A | 7/1995 | Norton |
| 5,463,224 | A | 10/1995 | Burstein |
| 5,483,569 | A | 1/1996 | Annis |
| 5,490,218 | A | 2/1996 | Krug |
| 5,493,596 | A | 2/1996 | Annis |
| 5,503,424 | A | 4/1996 | Agopian |
| 5,524,133 | A | 6/1996 | Neale |
| 5,528,656 | A | 6/1996 | Annis |
| 5,572,121 | A | 11/1996 | Beswick |
| 5,579,360 | A | 11/1996 | Abdel-Mottaleb |
| 5,590,057 | A | 12/1996 | Fletcher |
| 5,600,303 | A | 2/1997 | Husseiny |
| 5,600,700 | A | 2/1997 | Krug |
| 5,602,893 | A | 2/1997 | Harding |
| 5,638,420 | A | 6/1997 | Armistead |
| 5,642,393 | A | 6/1997 | Krug |
| 5,642,394 | A | 6/1997 | Rothschild |
| 5,660,549 | A | 8/1997 | Witt |
| 5,666,393 | A | 9/1997 | Annis |
| 5,692,028 | A | 11/1997 | Geus |
| 5,692,029 | A | 11/1997 | Husseiny |
| 5,696,806 | A | 12/1997 | Grodzins |
| 5,699,400 | A | 12/1997 | Lee |
| 5,763,886 | A | 6/1998 | Schulte |
| 5,764,683 | A | 6/1998 | Swift |
| 5,796,110 | A | 8/1998 | An |
| 5,838,758 | A | 11/1998 | Krug |
| 5,882,206 | A | 3/1999 | Gillio |
| 5,892,840 | A | 4/1999 | Jang |
| 5,910,973 | A | 6/1999 | Grodzins |
| 5,930,326 | A | 7/1999 | Rothschild |
| 5,940,468 | A | 8/1999 | Huang |
| 5,966,422 | A | 10/1999 | Dafni |
| 5,974,111 | A | 10/1999 | Krug |
| 6,018,562 | A | 1/2000 | Willson |
| 6,044,353 | A | 3/2000 | Pugliese |
| 6,057,761 | A | 5/2000 | Yukl |

(56) References Cited

U.S. PATENT DOCUMENTS

| | | |
|---|---|---|
| 6,081,580 A | 6/2000 | Grodzins |
| 6,094,472 A | 7/2000 | Smith |
| 6,137,895 A | 10/2000 | Al-Sheikh |
| 6,151,381 A | 11/2000 | Grodzins |
| 6,192,104 B1 | 2/2001 | Adams |
| 6,212,251 B1 | 4/2001 | Tomura |
| 6,236,709 B1 | 5/2001 | Perry |
| 6,249,567 B1 | 6/2001 | Rothschild |
| 6,269,142 B1 | 7/2001 | Smith |
| 6,272,206 B1 | 8/2001 | Bjorkholm |
| 6,278,115 B1 | 8/2001 | Annis |
| 6,282,264 B1 | 8/2001 | Smith |
| 6,298,603 B1 | 10/2001 | Diaz |
| 6,301,326 B2 | 10/2001 | Bjorkholm |
| 6,301,327 B1 | 10/2001 | Martens |
| 6,308,644 B1 | 10/2001 | Diaz |
| 6,315,308 B1 | 11/2001 | Konopka |
| RE37,467 E | 12/2001 | Brasch |
| 6,366,203 B1 | 4/2002 | Burns |
| 6,370,222 B1 | 4/2002 | Cornick |
| 6,375,697 B2 | 4/2002 | Davies |
| 6,393,095 B1 | 5/2002 | Robinson |
| 6,418,194 B1 | 7/2002 | McPherson |
| 6,421,420 B1 | 7/2002 | Grodzins |
| 6,442,233 B1 | 8/2002 | Grodzins |
| 6,459,761 B1 | 10/2002 | Grodzins |
| 6,459,764 B1 | 10/2002 | Chalmers |
| 6,473,487 B1 | 10/2002 | Le |
| 6,484,650 B1 | 11/2002 | Stomski |
| 6,507,278 B1 | 1/2003 | Brunetti |
| 6,546,072 B1 | 4/2003 | Chalmers |
| 6,552,346 B2 | 4/2003 | Verbinski |
| 6,553,096 B1 | 4/2003 | Zhou |
| 6,556,653 B2 | 4/2003 | Hussein |
| 6,567,496 B1 | 5/2003 | Sychev |
| 6,597,760 B2 | 7/2003 | Beneke |
| 6,610,977 B2 | 8/2003 | Megerle |
| 6,621,888 B2 | 9/2003 | Grodzins |
| 6,628,745 B1 | 9/2003 | Annis |
| 6,634,668 B2 | 10/2003 | Urffer |
| 6,653,588 B1 | 11/2003 | Gillard-Hickman |
| 6,665,373 B1 | 12/2003 | Kotowski |
| 6,674,367 B2 | 1/2004 | Sweatte |
| 6,707,879 B2 | 3/2004 | McClelland |
| 6,721,391 B2 | 4/2004 | McClelland |
| 6,742,301 B1 | 6/2004 | Schwarz |
| 6,745,520 B2 | 6/2004 | Puskaric |
| 6,749,207 B2 | 6/2004 | Nadeau |
| 6,754,304 B1 | 6/2004 | Kumakhov |
| 6,785,360 B1 | 8/2004 | Annis |
| 6,819,109 B2 | 11/2004 | Sowers |
| 6,819,241 B2 | 11/2004 | Turner |
| 6,839,403 B1 | 1/2005 | Kotowski |
| 6,848,826 B2 | 2/2005 | Marie |
| 6,870,791 B1 | 3/2005 | Caulfield |
| 6,876,719 B2 | 4/2005 | Ozaki |
| 6,879,657 B2 | 4/2005 | Hoffman |
| 6,891,381 B2 | 5/2005 | Bailey |
| 6,899,540 B1 | 5/2005 | Neiderman |
| 6,901,346 B2 | 5/2005 | Tracy |
| 6,911,907 B2 | 6/2005 | Kelliher |
| 6,952,163 B2 | 10/2005 | Huey |
| 6,965,340 B1 | 11/2005 | Baharav |
| 6,967,612 B1 | 11/2005 | Gorman |
| 6,970,086 B2 | 11/2005 | Nelson |
| 6,970,087 B2 | 11/2005 | Stis |
| 6,990,175 B2 | 1/2006 | Nakashima |
| 7,053,785 B2 | 5/2006 | Akins |
| 7,092,485 B2 | 8/2006 | Kravis |
| 7,103,137 B2 | 9/2006 | Seppi |
| 7,110,493 B1 | 9/2006 | Kotowski |
| 7,110,925 B2 | 9/2006 | Pendergraft |
| 7,114,849 B2 | 10/2006 | Atzinger |
| 7,142,638 B2 | 11/2006 | Polichar |
| 7,162,005 B2 | 1/2007 | Bjorkholm |
| 7,164,747 B2 | 1/2007 | Ellenbogen |
| 7,185,206 B2 | 2/2007 | Goldstein |
| 7,203,276 B2 | 4/2007 | Arsenault |
| 7,257,189 B2 | 8/2007 | Modica |
| 7,265,709 B2 | 9/2007 | Fleisher |
| 7,286,634 B2 | 10/2007 | Sommer |
| 7,305,062 B2 | 12/2007 | Hambuechen |
| 7,305,063 B2 | 12/2007 | Heuscher |
| 7,330,529 B2 | 2/2008 | Kautzer |
| 7,333,587 B2 | 2/2008 | De |
| 7,356,115 B2 | 4/2008 | Ford |
| 7,365,672 B2 | 4/2008 | Keller |
| 7,400,701 B1 | 7/2008 | Cason |
| 7,418,077 B2 | 8/2008 | Gray |
| 7,460,636 B2 | 12/2008 | Ein-Gal |
| 7,476,023 B1 | 1/2009 | Canfield |
| 7,505,557 B2 | 3/2009 | Modica |
| 7,505,562 B2 | 3/2009 | Dinca |
| 7,551,709 B2 | 6/2009 | Schlomka |
| 7,551,715 B2 | 6/2009 | Rothschild |
| 7,561,666 B2 | 7/2009 | Annis |
| 7,593,506 B2 | 9/2009 | Cason |
| 7,593,510 B2 | 9/2009 | Rothschild |
| 7,639,866 B2 | 12/2009 | Pomero |
| 7,660,388 B2 | 2/2010 | Gray |
| 7,684,544 B2 | 3/2010 | Wilson |
| 7,783,004 B2 | 8/2010 | Kotowski |
| 7,796,394 B2 | 9/2010 | Wang |
| 7,796,733 B2 | 9/2010 | Hughes |
| 7,796,734 B2 | 9/2010 | Mastronardi |
| 7,806,589 B2 | 10/2010 | Tashman |
| 7,809,109 B2 | 10/2010 | Mastronardi |
| 7,817,776 B2 | 10/2010 | Agrawal |
| 7,826,589 B2 | 11/2010 | Kotowski |
| 8,135,112 B2 | 3/2012 | Hughes |
| 8,576,982 B2 * | 11/2013 | Gray et al. ............ 378/57 |
| 8,638,904 B2 * | 1/2014 | Gray et al. ............ 378/57 |
| 8,995,619 B2 | 3/2015 | Gray |
| 2002/0045152 A1 | 4/2002 | Viscardi |
| 2003/0012338 A1 | 1/2003 | Lienard |
| 2003/0171939 A1 | 9/2003 | Yagesh |
| 2003/0225612 A1 | 12/2003 | Desimone |
| 2003/0229506 A1 | 12/2003 | Scott |
| 2004/0088584 A1 | 5/2004 | Shachar |
| 2004/0175018 A1 | 9/2004 | MacArthur |
| 2005/0276379 A1 | 12/2005 | Polichar |
| 2006/0262902 A1 | 11/2006 | Wattenburg |
| 2007/0009088 A1 | 1/2007 | Edic |
| 2007/0086564 A1 | 4/2007 | Bruder |
| 2007/0098142 A1 | 5/2007 | Rothschild |
| 2007/0235652 A1 | 10/2007 | Smith |
| 2008/0144777 A1 | 6/2008 | Wilson |
| 2008/0212742 A1 | 9/2008 | Hughes |
| 2009/0041186 A1 | 2/2009 | Gray |
| 2009/0082762 A1 | 3/2009 | Ormsby |
| 2009/0103686 A1 | 4/2009 | Rothschild |
| 2009/0116614 A1 | 5/2009 | Kotowski |
| 2009/0116617 A1 | 5/2009 | Mastronardi |
| 2009/0245462 A1 | 10/2009 | Agrawal |
| 2011/0017917 A1 | 1/2011 | Mastronardi |
| 2011/0096901 A1 | 4/2011 | Kotowski |
| 2011/0164726 A1 | 7/2011 | Mastronardi |
| 2011/0274249 A1 | 11/2011 | Gray |
| 2011/0274250 A1 | 11/2011 | Gray |
| 2011/0293072 A1 | 12/2011 | Kaminski |
| 2011/0299659 A1 | 12/2011 | Gray |

FOREIGN PATENT DOCUMENTS

| | | |
|---|---|---|
| CN | 101467071 | 6/2012 |
| CN | 101379415 | 7/2013 |
| EP | 0261984 A2 | 3/1988 |
| WO | 2009006044 | 1/2009 |
| WO | 2009082762 | 7/2009 |
| WO | 2009082762 A1 | 7/2009 |
| WO | 2011115923 A1 | 9/2011 |

(56) References Cited

FOREIGN PATENT DOCUMENTS

| | | |
|---|---|---|
| WO | 2011115930 A2 | 9/2011 |
| WO | 2011115934 A2 | 9/2011 |
| WO | 2011115935 A1 | 9/2011 |

OTHER PUBLICATIONS

Daniel Strom, "Screening Individuals with Backscatter X-Ray Systems", Health Physics Society, Feb. 3, 2005.

Gerald J. Smith, 'Bodysearch Technology Uses X-ray Imaging to Remove Hazards and Humiliation from Personnel Searches', IEEE, 1995.

International Search Report, PCT/US2008/067619, Aug. 20, 2008, Rapiscan Security Products.

International Search Report, PCT/US2008/088345, Apr. 3, 2009, Rapiscan Security Products.

MSNBC, "Airports Seek Hi-Tech Security", Apr. 3, 2002.

Murray et al., 'Exploitation of X-Ray Technology for the Detection of Contraband-Aviation Security Applications', European Conference on Security and Detection, Apr. 28-30, 1997.

Rapiscan Security Products, Secure 1000 Brochure, 2002.

Rapiscan Security Products, Secure 1000 Concealed Object Detection System, Nov. 1998.

Rapiscan Systems Secure 1000 Case Study, London Heathrow Terminal 4, Fall 2004.

St. Bartholomew's Hospital, Radiation Safety Report on the Rapiscan Secure 1000 X-Ray System, Nov. 4, 2004.

International Search Report, PCT/US11/28411, Sep. 27, 2011, Rapiscan Systems Inc.

International Search Report, PCT/US11/28393, Jul. 8, 2011, Rapiscan Systems Inc.

International Search Report, PCT/US11/28413, Jul. 22, 2011, Rapiscan Systems Inc.

First Office Action for Chinese Application No. 2011800241163, Nov. 2014.

First office action for Chinese Application No. CN 201180024005.2, dated Jun. 23, 2014.

International Search Report, PCT/US11/28403, Oct. 11, 2011, Rapiscan Systems Inc.

* cited by examiner

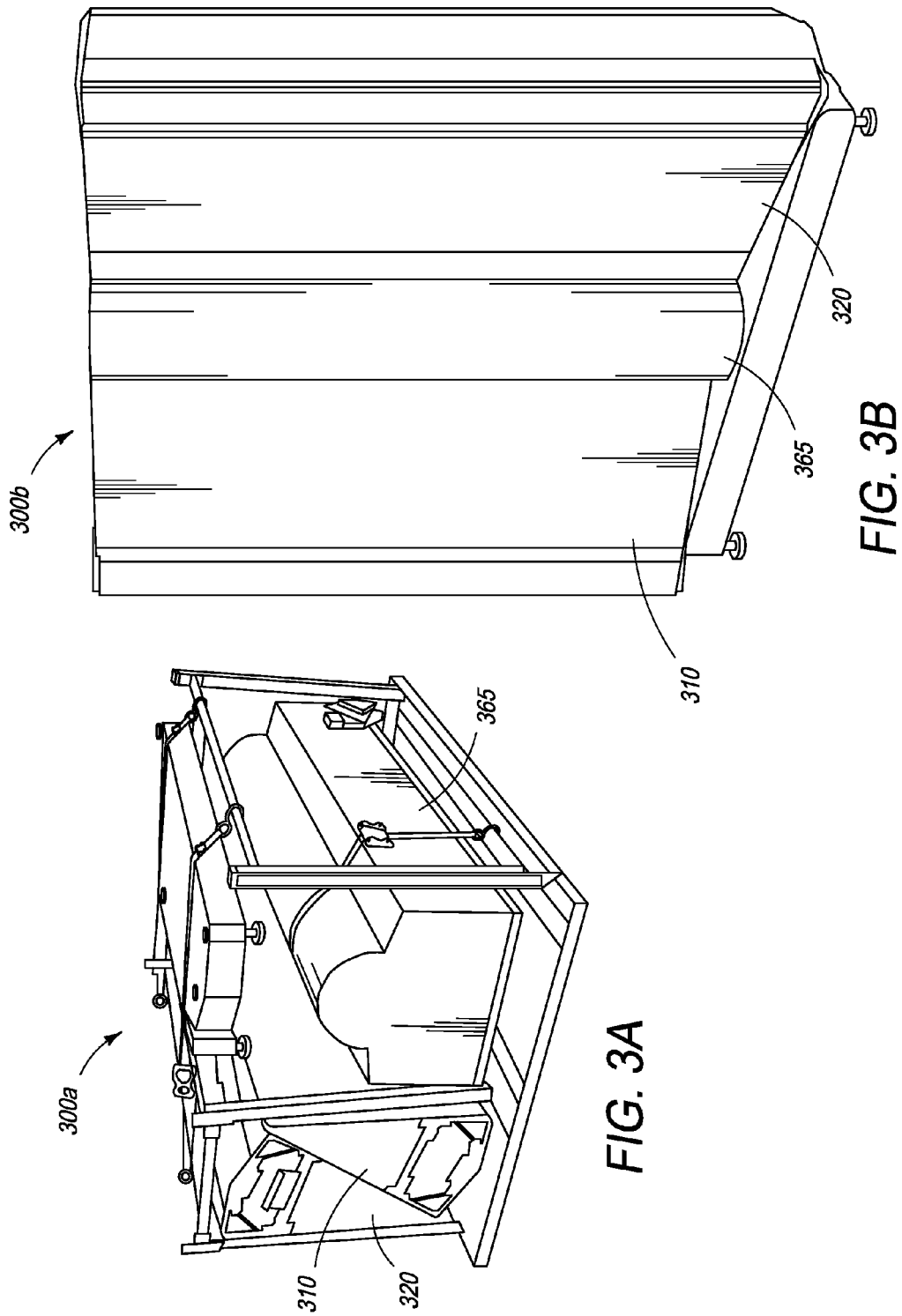

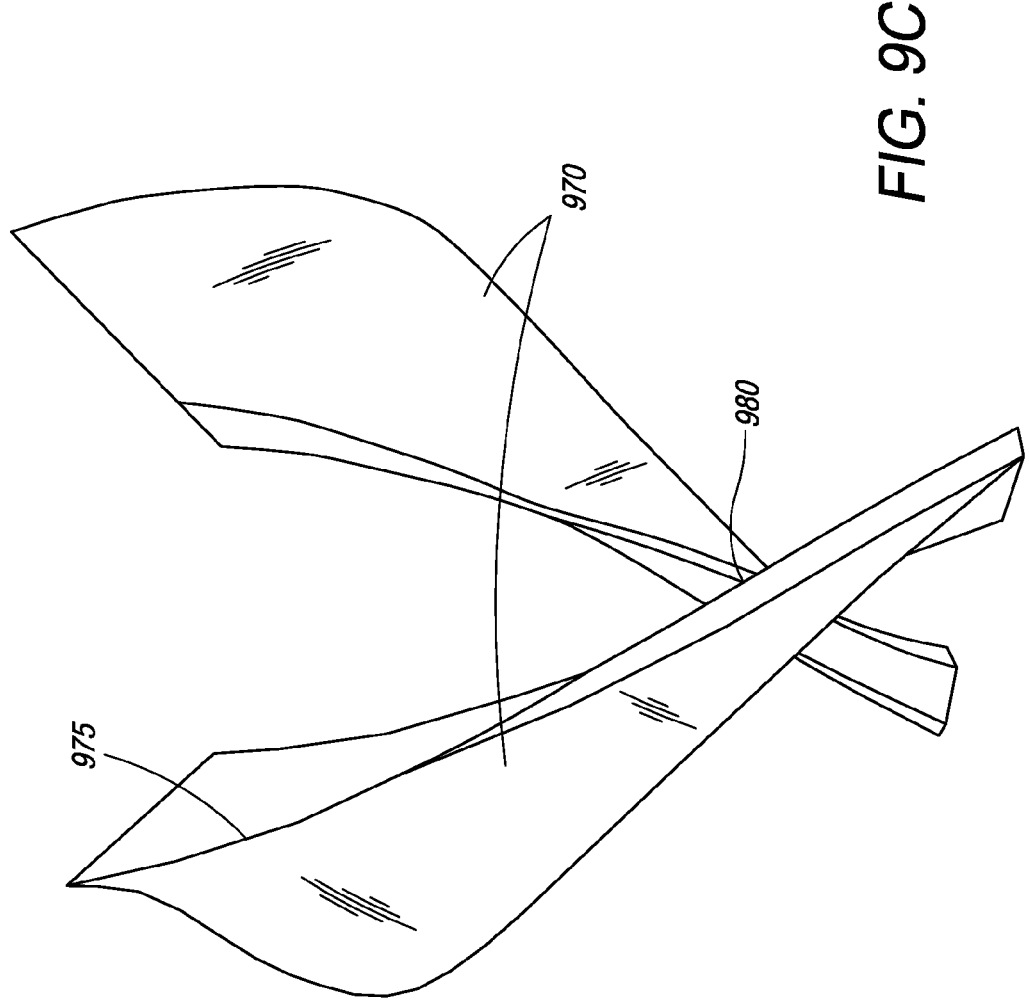

PERSONNEL SCREENING SYSTEM

CROSS-REFERENCE TO RELATED APPLICATIONS

The present application is a continuation application of U.S. patent application Ser. No. 13/047,743, filed on Mar. 14, 2011 and entitled "Personnel Screening System", which relies on U.S. Provisional Patent Application No. 61/313,772, filed on Mar. 14, 2010, for priority, both of which are herein incorporated by reference in their entirety.

The '743 application also relies on U.S. Provisional Patent Application No. 61/423,585, filed on Dec. 15, 2010, for priority, which is herein incorporated by reference in its entirety.

In addition, the '743 application relies on U.S. Provisional Patent Application No. 61/423,582, filed on Dec. 15, 2010, for priority, which is herein incorporated by reference in its entirety.

In addition, the '743 application relies on U.S. Provisional Patent Application No. 61/423,586, filed on Dec. 15, 2010, for priority, which is herein incorporated by reference in its entirety.

Further, the '743 application is a continuation-in-part of U.S. patent application Ser. No. 12/887,510, filed on Sep. 22, 2010, entitled "Security System for Screening People", assigned to the applicant of the present invention, and now abandoned, which is a continuation of U.S. patent application Ser. No. 12/344,162, filed on Dec. 24, 2008, of the same title, also assigned to the applicant of the present invention, and now issued as U.S. Pat. No. 7,826,589, which relies on U.S. Provisional Patent Application No. 61/016,590, filed on Dec. 25, 2007, for priority, all of which are herein incorporated by reference in their entirety.

Further, the '743 application is a continuation-in-part of U.S. patent application Ser. No. 12/849,987, filed on Aug. 4, 20120, entitled "Personnel Screening System with Enhanced Privacy", assigned to the applicant of the present invention, and now issued as U.S. Pat. No. 8,135,112, which is a continuation of U.S. patent application Ser. No. 12/024,320, filed on Feb. 1, 2008, of the same title, also assigned to the applicant of the present invention, and now issued as U.S. Pat. No. 7,796,733, which relies on U.S. Provisional Patent Application No. 60/887,798, filed on Feb. 1, 2007, for priority, all of which are herein incorporated by reference in their entirety.

FIELD OF THE INVENTION

The present specification relates generally to security systems for screening threats contained on persons, and specifically, to a personnel screening system that comprises modular components for improved portability, and more specifically, to compact and portable detector towers.

BACKGROUND OF THE INVENTION

Radiation based systems for screening people and in use today at transit points, such as airports, courthouses, etc., are generally portal systems that are bulky and not conducive for portable applications. Unfortunately, such prior art screening systems are not compact enough (example, have heavy back-end cables and wires for connecting the photomultiplier tubes to a centralized analog-to-digital conversion and power station) and are often difficult and time-consuming to use and/or transport.

Also, security systems are presently limited in their ability to detect contraband, weapons, explosives, and other dangerous objects concealed under clothing. Metal detectors and chemical sniffers are commonly used for the detection of large metal objects and certain types of explosives, however, a wide range of dangerous objects exist that cannot be detected using these devices. Plastic and ceramic weapons increase the types of non-metallic objects that security personnel are required to detect. Manual searching of subjects is slow, is inconvenient, and would not be well tolerated by the general public, especially as a standard procedure in high traffic centers, such as at airports.

It is known in the art that images of various types of material can be generated using X-ray scattering. The intensity of scattered X-rays is related to the atomic number (Z) of the material scattering the X-rays. In general, for atomic numbers less than 25, the intensity of X-ray backscatter, or X-ray reflectance, decreases with increasing atomic number. Images are primarily modulated by variations in the atomic number of the subject's body. Low-Z materials present a special problem in personnel inspection because of the difficulty in distinguishing the low-Z object from the background of the subject's body which also has low-Z.

Known prior art X-ray systems for detecting objects concealed on persons have limitations in their design and method that prohibit them from achieving low radiation doses, which is a health requirement, or prevent the generation of high image quality, which are prerequisites for commercial acceptance. An inspection system that operates at a low level of radiation exposure is limited in its precision by the small amount of radiation that can be directed towards a person being searched. X-ray absorption and scattering further reduces the amount of X-rays available to form an image of the person and any concealed objects. In prior art systems this low number of detected X-rays has resulted in unacceptably poor image quality.

This problem is even more significant if an X-ray inspection system is being used in open venues such as stadiums, shopping malls, open-air exhibitions and fairs, etc. At such venues, people can be located both proximate to and/or at a distance from the machine. If a person being scanned is not very close to the X-ray machine, the resultant image may not be clear enough since the amount of radiation reaching the person is very low. This limits the range of scanning of the system to a few feet from the front of the machine. If, however, a person being scanned is too close to the X-ray machine, the amount of radiation impinging on the person may not be safe.

Further, X-ray screening systems deployed at airports in the United States of America (U.S.A.), for performing automatic threat detection, have to comply with guidelines set by the Transportation Security Administration (TSA). Current TSA guidelines require being capable of scanning a person at least 6 feet 6 inches tall from elbow to elbow which translates into a scanning width of at least 103 centimeters. Also, given the increasing rush at the airports, a screening system deployed at an airport or other such heavy throughput areas must provide a fast scanning time, preferably ranging around 10 seconds per scan. Yet further, a screening system should preferably be compliant with laws governing disabled persons. In the U.S.A the screening systems must be compliant with the regulations set forth in the Americans with Disabilities Act (ADA).

Still further, X-ray screening systems that are employed by the defense forces of a nation have to comply with stringent criteria, in order to meet the security guidelines set by the defense department. The screening systems deployed for military use include indoor as well as outdoor deployment, usually in difficult terrains. Most of the presently available screening systems being used by defense forces are very large, one piece systems that require a forklift, and are not really sized to get in and out of regular doors.

Hence, screening systems that can be easily transported either by using multi utility vans or helicopters to screening locations are required for defense use. In the U.S.A. screening systems deployed at military and naval locations are required to abide by the guidelines set out by the Department of Defense (DOD) and Occupational Safety and Health Administration (OSHA), relating to two man portability standards. OSHA standards for two man portability stipulate a weight no greater than 44 pounds for one person and no greater than 88 pounds for two persons.

Therefore, there is a need for an X-ray screening system that provides good resolution as well as large range of view and fast scanning speed, while keeping the radiation exposure within safe limits. Also is required a screening system that may be deployed easily by virtue of modularity, smaller size, reduced weight and rapid assembly; while at the same time providing a higher scan speed (higher personnel throughput), and the latest processing electronics.

There is also a need for a modular system that can be deployed in a small set (such as less than 6) of easily attachable components, each of which is below the aforementioned portability standards.

SUMMARY OF THE INVENTION

In one embodiment, the present specification discloses a method for manufacturing an inspection system, comprising: receiving at least one container, wherein said at least one container comprises a) a first detection system configured to detect radiation scattered from a person, wherein the first detection system is contained within a first enclosure; b) a second detection system configured to detect radiation scattered from the person, wherein the second detection system is contained within a second enclosure; c) an X-ray source positioned between said first detection system and said second detection system, wherein said X-ray source is configured to generate a beam spot pattern and wherein the X-ray source is contained within a third enclosure having an angled left side and an angled right side; attaching said first enclosure to the third enclosure, wherein said attachment abuts the first enclosure against the angled left side of the third enclosure; and attaching said second enclosure to the third enclosure, wherein said attachment abuts the second enclosure against the angled right side of the third enclosure.

Optionally, the first, second, and third enclosures are each physically separate from, and independent of, each other. Each of the first, second, and third enclosures weigh less than 88 pounds. Each of the first, second, and third enclosures are detachably connected to a frame.

In another embodiment, the present specification discloses a kit containing components of an inspection system, comprising: a first detection system configurable to detect radiation scattered from a person, wherein the first detection system is contained within a first enclosure; a second detection system configurable to detect radiation scattered from the person, wherein the second detection system is contained within a second enclosure; a radiation source assembly, comprising a radiation source, beam forming apparatus, and motor for moving said radiation source and beam forming apparatus, wherein said radiation source assembly is contained within a third enclosure and wherein said third enclosure is configured to be positioned between said first enclosure and said second enclosure, a frame; and a signal processing system in a fourth enclosure, wherein each of said first enclosure, second enclosure, third enclosure, frame, and fourth enclosure are physically separate from each other and wherein each weighs less than 100 pounds.

Optionally, each of said first enclosure, second enclosure, third enclosure, frame, and fourth enclosure weighs 88 pounds or less. The first enclosure comprises: a first side defined by a planar surface having an exterior surface facing the person and an interior surface, wherein the first side is configured to receive the radiation scattered from the person; a second side in an acute angular relationship with said first side, wherein said second side is defined by a planar surface having an interior surface adapted to receive radiation passing through the first side and wherein said second side is configured to receive radiation after it passes through said first side; a first substrate positioned on the interior surface of the first side, wherein the first substrate further comprises an active area for receiving and converting said radiation into light; a second substrate positioned on the interior surface of the second side, wherein the second substrate further comprises an active area for receiving and converting said radiation into light; and at least one photodetector having a light responsive area and a non-light responsive area, wherein the light responsive area is positioned to receive the light emitted from the first substrate and the second substrate.

Optionally, the first enclosure comprises a plurality of photomultiplier tubes. The first enclosure further comprises an analog to detector converter to convert pulse current output from said photomultiplier tubes into digital signals. The first enclosure further comprises a power supply for supply power to said photomultiplier tubes. Each of the first enclosure, second enclosure, and third enclosure is adapted to be detachably connected to said frame and wherein the fourth enclosure is not connected to said frame. The fourth enclosure is remote from said frame. Each of the first enclosure, second enclosure, and third enclosure are configured to be in wired communication with the signal processing system.

In another embodiment, the present specification discloses a method for manufacturing an inspection system, comprising: transporting a first enclosure to an inspection site, wherein the first enclosure comprises a first detection system configurable to detect radiation scattered from a person; transporting a second enclosure to an inspection site, wherein the second enclosure comprises a second detection system configurable to detect radiation scattered from a person; transporting a third enclosure to an inspection site, wherein the third enclosure comprises an X-ray source assembly having an X-ray source, beam forming apparatus, motor, and elevation mechanism; transporting a base to the inspection site; attaching said first enclosure, second enclosure, and third enclosure to the base; connecting a wire carrying a digital signal output from said first detection system to a signal processing system; connecting a wire carrying a digital signal output from said second detection system to the signal processing system; and placing said X-ray source assembly in electrical communication with the signal processing system.

Each of the first, second, frame, and third enclosures weigh less than 88 pounds. The first enclosure comprises: a first side defined by a planar surface having an exterior surface facing the person and an interior surface, wherein the first side is configured to receive the radiation scattered from the person; a second side in an acute angular relationship with said first side, wherein said second side is defined by a planar surface having an interior surface adapted to receive radiation passing through the first side and wherein said second side is configured to receive radiation after it passes through said first side; a first substrate positioned on the interior surface of the first side, wherein the first substrate further comprises an active area for receiving and converting said radiation into light; a second substrate positioned on the interior surface of the second side, wherein the second substrate further comprises an active area for receiving and converting said radiation into light; and a plurality of photomultiplier tubes positioned to receive the light emitted from the first substrate and the second substrate.

The first enclosure further comprises an analog to detector converter to convert pulse current output from said photomultiplier tubes into digital signals. The first enclosure further comprises a power supply for supply power to said photomultiplier tubes. The second enclosure comprises: a first side defined by a planar surface having an exterior surface facing the person and an interior surface, wherein the first side is configured to receive the radiation scattered from the person; a second side in an acute angular relationship with said first side, wherein said second side is defined by a planar surface having an interior surface adapted to receive radiation passing through the first side and wherein said second side is configured to receive radiation after it passes through said first side; a first substrate positioned on the interior surface of the first side, wherein the first substrate further comprises an active area for receiving and converting said radiation into light; a second substrate positioned on the interior surface of the second side, wherein the second substrate further comprises an active area for receiving and converting said radiation into light; and a plurality of photomultiplier tubes positioned to receive the light emitted from the first substrate and the second substrate. Optionally, the second enclosure further comprises an analog to detector converter to convert pulse current output from said photomultiplier tubes into digital signals. The second enclosure further comprises a power supply for supply power to said photomultiplier tubes.

Optionally, the method further comprises transporting a fourth enclosure to an inspection site, wherein the fourth enclosure comprises a third detection system configurable to detect radiation scattered from a person; transporting a fifth enclosure to an inspection site, wherein the fifth enclosure comprises a fourth detection system configurable to detect radiation scattered from a person; transporting a sixth enclosure to an inspection site, wherein the sixth enclosure comprises a second X-ray source assembly having an X-ray source, beam forming apparatus, motor, and elevation mechanism; transporting a second base to the inspection site; attaching said fourth enclosure, fifth enclosure, and sixth enclosure to the second base; connecting a wire carrying a digital signal output from said third detection system to the signal processing system; connecting a wire carrying a digital signal output from said fourth detection system to the signal processing system; and placing said second X-ray source assembly in electrical communication with the signal processing system. The method further comprises optically aligning said first detection system, X-ray source assembly, and second detection system with said third detection system, second X-ray source assembly, and fourth detection system.

BRIEF DESCRIPTION OF THE DRAWINGS

These and other features and advantages of the present invention will be appreciated, as they become better understood by reference to the following detailed description when considered in connection with the accompanying drawings, wherein:

FIG. 3a is an unassembled and packaged illustration of an exemplary modular X-ray backscatter system configuration, including detection system and towers, for the personnel screening system of the present invention;

FIG. 3b is an assembled illustration of the exemplary modular X-ray backscatter system configuration shown in FIG. 3a;

FIG. 9c is a mathematical expression of the trajectory of the beam using the spin-roll chopper of the present invention with a single source, in accordance with one embodiment;

DETAILED DESCRIPTION OF THE INVENTION

Figure 1:
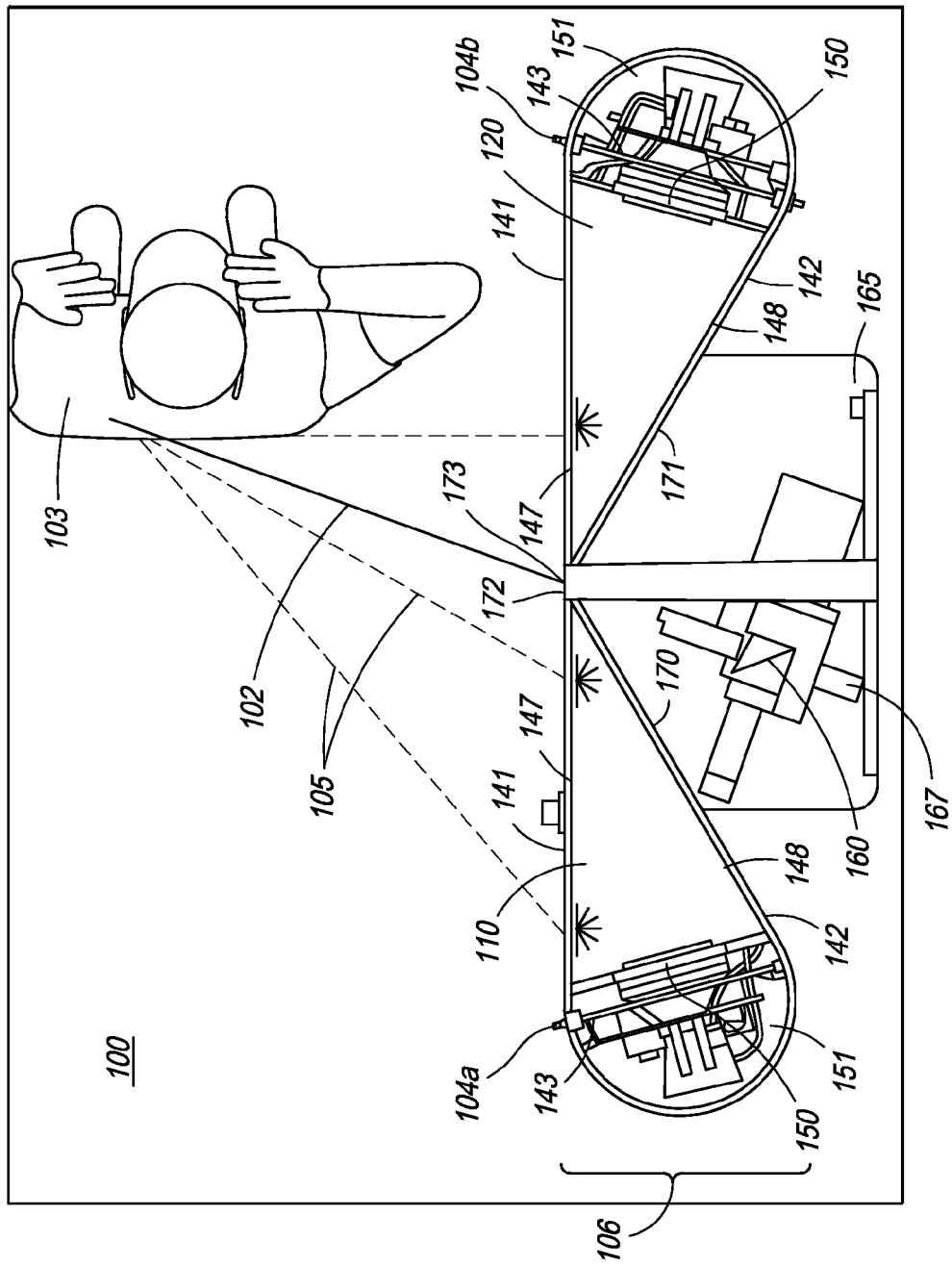
FIG. 1 illustrates an exemplary X-ray backscatter system configuration, including a detection system and towers, for the screening system of the present invention.

The present invention provides an improved system of screening individuals at security locations. The system provided by the present invention has modular components that can be disassembled for mobility and ease of transportation and reassembled again at the site of interest. The system of the present invention allows for maximum threat detection performance and image clarity irrespective of the distance of the individuals from the screening system.

U.S. Pat. Nos. 7,418,077 and 7,660,388, both entitled "Integrated Carry-On Baggage Cart and Passenger Screening Station" and assigned to the applicant of the present invention, are herein incorporated by reference in their entirety.

In one embodiment, the screening system of the present invention is a walk-through inspection system comprising at least two scanning modules, each comprising a radiation source and at least two detector modules. The screening system provides a reduced operational footprint while still providing high resolution scan images.

The system allows for detection of threats by efficient imaging of explosive materials such as dynamite, C-4, as well as ceramics, graphite fibers, plastic containers, plastic weapons, glass vials, syringes, packaged narcotics, bundled paper currency, and even wooden objects.

In an embodiment, the screening system is based upon X-ray backscatter principles. In X-ray backscatter systems for detecting concealed objects, a pencil beam of X-rays traverses over the surface of the body of a person being examined. X-rays that are scattered or reflected from the subject's body are detected by a detector such as, for example, a scintillator and photomultiplier tube combination. The resultant signal produced by the X-ray detector is then used to produce a body image, such as a silhouette, of the subject and any concealed objects carried by the subject. The design of the X-ray backscatter imaging system of the present invention is optimized for near real-time imaging of people or objects with an interrogating radiation beam, while they are in motion. The system is also capable of automatically detecting threats by processing detection algorithms on the image data in near real-time.

The present specification is directed towards personnel screening systems comprising modular components, including detector and source units. The modular components of the present invention allow for compact, light and yet sufficiently rugged overall structure that can be disassembled for ease of transportation and is also simple to reassemble at a required site for inspection. The novel modular architecture of the screening system of the present invention also allows for the modular components to be fabricated separately and be quickly snapped on for assembly. Similarly, the modular components can be easily disassembled for ease of service access to the selective components and/or for packaging for subsequent transportation.

The present specification is also an improved method for screening individuals at security locations without exposing individuals to high radiation and retaining the efficiency of the screening process. The disclosed system allows for maximum threat detection performance and image clarity irrespective of the distance of the individuals from the screening system.

In one embodiment, a radiographic image is formed using any available radiation imaging technique for "body imaging" such as, but not limited to X-ray scattering, infrared imaging, millimeter wave imaging, RF imaging, radar imaging, holographic imaging, CT imaging, and MRI. Any "body imaging" system that has the potential for displaying body detail may be employed. In one embodiment, any photodetectable radiation or any radiation source with a light beam may be employed in the present invention.

In one embodiment, the system of the present invention requires a subject under inspection to assume only one position and uses a single source with a single group of detectors, circuits and processor to generate two separately processed scanning beams and associated images.

In one embodiment, the system of the present invention is a walk-through inspection system that uses a single source with a single group of detectors, circuits and processor to generate two separately processed scanning beams and associated images.

In another embodiment, the system operates in a dual-source mode but uses a single group of detectors, circuits and processor.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

FIG. 1 illustrates an exemplary X-ray backscatter system configuration for the novel modular screening system 100 of the present invention. Referring to FIG. 1, an X-ray source 160 is enclosed in a modular housing 165 and is employed to generate a narrow pencil beam 102 of X-rays directed towards the subject under inspection 103.

In one embodiment, pencil beam 102 is formed with the integration of an X-ray tube and a beam chopping mechanism 167. The pencil beam 102 is rastered either horizontally or vertically across the subject. This rastering is the result of the beam chopping mechanism by only allowing a minimal exit aperture for the x-ray beam to project. If a chopper wheel is employed, as described below, the exit aperture is 1 mm in diameter resulting in an X-ray beam that has diverged to about 7 mm. In one embodiment, subject 103 is a human. As the target (person being scanned) 103 poses in front of or walks by the screening system 100, the resultant pencil beam 102 hits the target, whereby at least a portion of the X-rays are backscattered. Exemplary embodiments of beam chopping mechanism 167 are described in greater detail below.

It should be understood to those of ordinary skill in the art that any number of ionizing radiation sources may be used, including but not limited to gamma radiation, electromagnetic radiation, and ultraviolet radiation. Preferably the X-ray energies employed are between 30 kV and 100 kV.

In one embodiment, sensors 104a and 104b are employed to detect the presence of a person as he or she poses in front of or walks through the screening system.

At least a portion of the scattered X-rays 105 impinges upon detector arrangement 106. In one embodiment, detector arrangement 106 in the screening system of the present invention comprises first and second detector enclosures 110 and 120 for enabling detection. In one embodiment, first and second detector enclosures 110 and 120 are embodied in the form of modular detector towers, which comprise at least one scintillator screen. In another embodiment, first and second detector enclosures 110 and 120 are modular detector towers that comprise at least two detector screens. In alternate embodiments, the detector enclosures may comprise any number of arrangements including, but, not limited to a plurality of detector screens. U.S. patent application Ser. No. 12/262,631, entitled "Multiple Screen Detection System" and assigned to the applicant of the present invention, is herein incorporated by reference. In addition, U.S. Provisional Patent Application No. 61/313,733, entitled "Multiple Screen Detection Systems" and filed on Mar. 14, 2010, is herein incorporated by reference in its entirety.

As shown in FIG. 1, detector towers 110 and 120 each comprise first side area 141, second side area 142, and third side area 143 that are connected to each other at an angle to form a triangular cross-section. The first side area 141 comprises screen 147 and faces subject 103 under inspection. The second side area 142 comprises a second screen 148 in the interior of the towers. In one embodiment, screens 147, 148 are relatively thick CaWO$_4$ scintillator screens that have a relatively short decay time of 10 microseconds that allows for the rapid scanning of the radiation beam with minimal image degradation. The CaWO$_4$ screen, in one embodiment, is capable of detecting approximately 70% of the backscattered or transmitted radiation, and thus, produces approximately 250 usable light photons per 30 keV X-ray. Additionally, the use of a thicker screen enables the detection of more of the radiation incident upon the detector at the expense of lower light output. In one embodiment, the areal density of the screen is 80 milligrams per square centimeter.

In one embodiment, to fasten the detector towers to the base, large diameter shoulder bolts are pre-fastened to the base, such that the detector towers can be "twisted" and locked onto the base. Once the radiation source and housing is attached to the base, the detector towers cannot be moved and twisted off. Radiation housing area 165 comprises first angled side 170 and second angled side 171 such that they easily abut and coincide with the sides 142 of the detector towers 110 and 120, when the detector towers and the radiation source housing are integrated or assembled together. A front-end side strip 172 facing the subject 103 comprises an opening 173 through which X-ray beam 102 passes before striking subject 103. Limited opening 173 aids in the reduction of electromagnetic interference and radiation noise. The side strip 172 also acts as a separator for the two detector towers such that the two detector towers are assembled symmetrically around incident X-ray pencil beam 102 to detect backscattered X-rays 105 and provide an electronic signal characteristic of the X-ray reflectance.

In one embodiment, the detector towers 110 and 120 are spaced apart by the strip 172 such that the chopper wheel or other beam collimation means is in the middle of the two towers. The two towers 110, 120 are separated by a distance 'd', that in one embodiment ranges from ½ to 2 times the diameter of the chopper wheel. The distance 'd' defines the field of view for the X-ray source and is optimized for a sufficient field of view while preventing overexposure of the detectors.

According to one embodiment of the present invention, detector towers 110, 120 and radiation housing 165 are of composite walls or any other similar non-conductive material evident to those of ordinary skill in the art that provides an optimization of a sturdy yet light overall structure. Specifically, housing the back-end electronics, wires and cables associated with the photomultipliers and radiation source within composite walls creates a Faraday cage, thus substantially reducing electromagnetic interference.

In an embodiment of the present invention, detector towers 110, 120 also comprise lighting means, such as LEDs, on the periphery or any one of the edges of the front area 141 for illumination depicting that the screening system is on and/or screening is in progress. Each of the towers 110, 120 comprises photomultiplier tubes 150 that are placed in the interior of the towers proximate to third side area 143. The back-end electronics of the photomultiplier tubes 150 is housed in the substantially semi-circular housing 151.

Figure 2A:
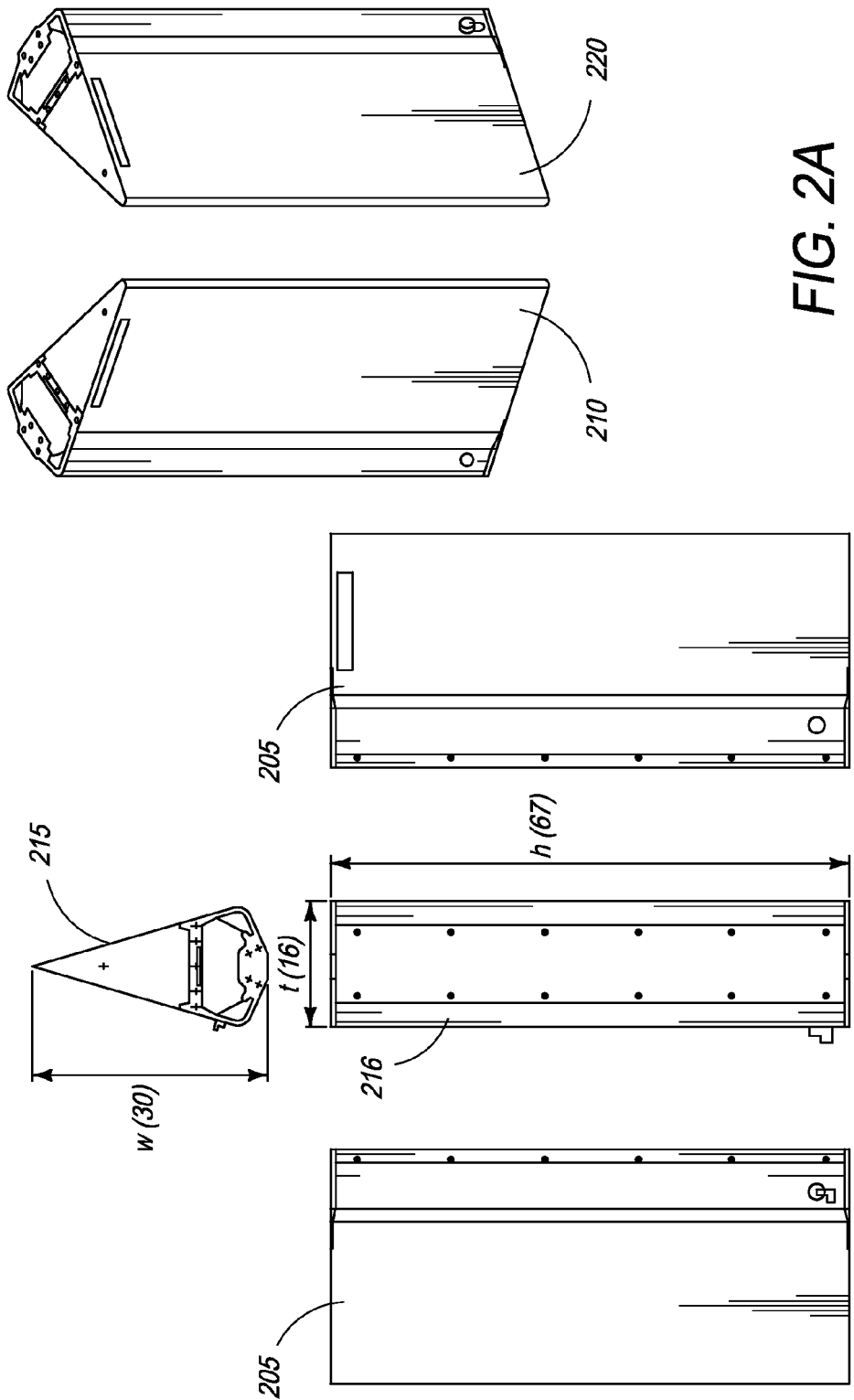
FIG. 2a shows multiple views of the detector towers in accordance with an embodiment of the present invention.
Figure 2B:
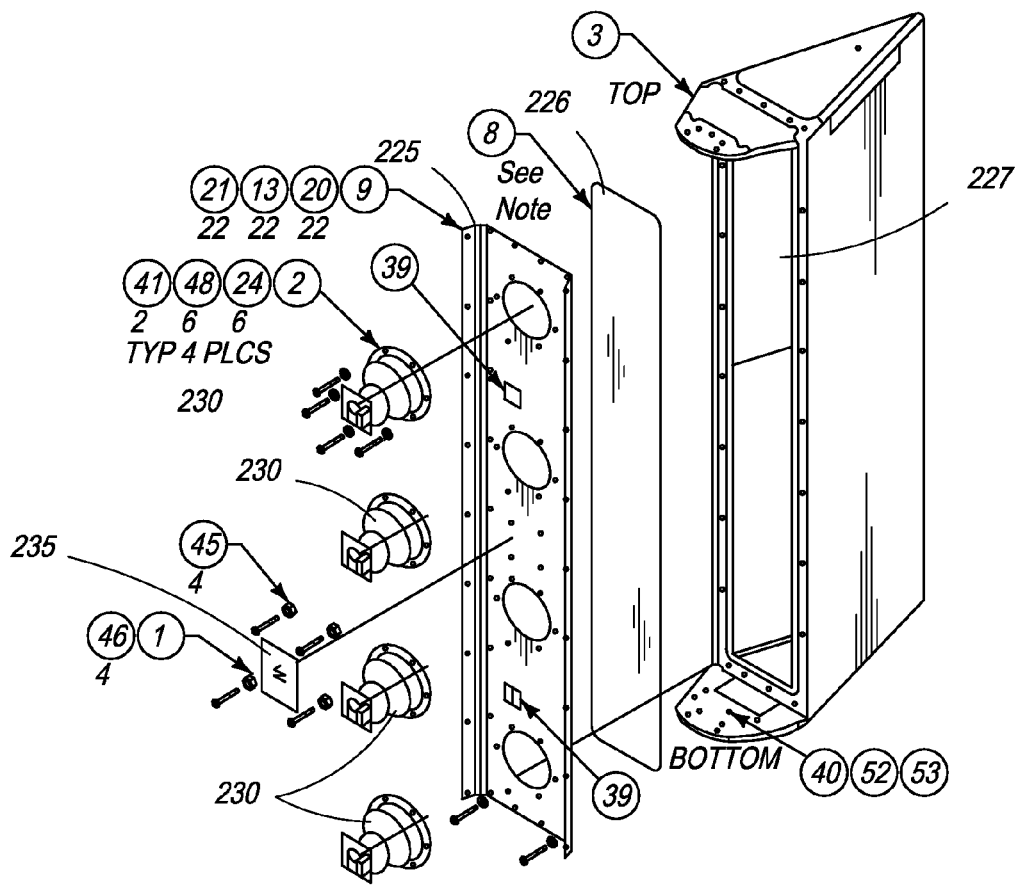
FIG. 2b shows an exploded view of the photomultiplier tubes, mounting plate and signal processing card.
Figure 2C:
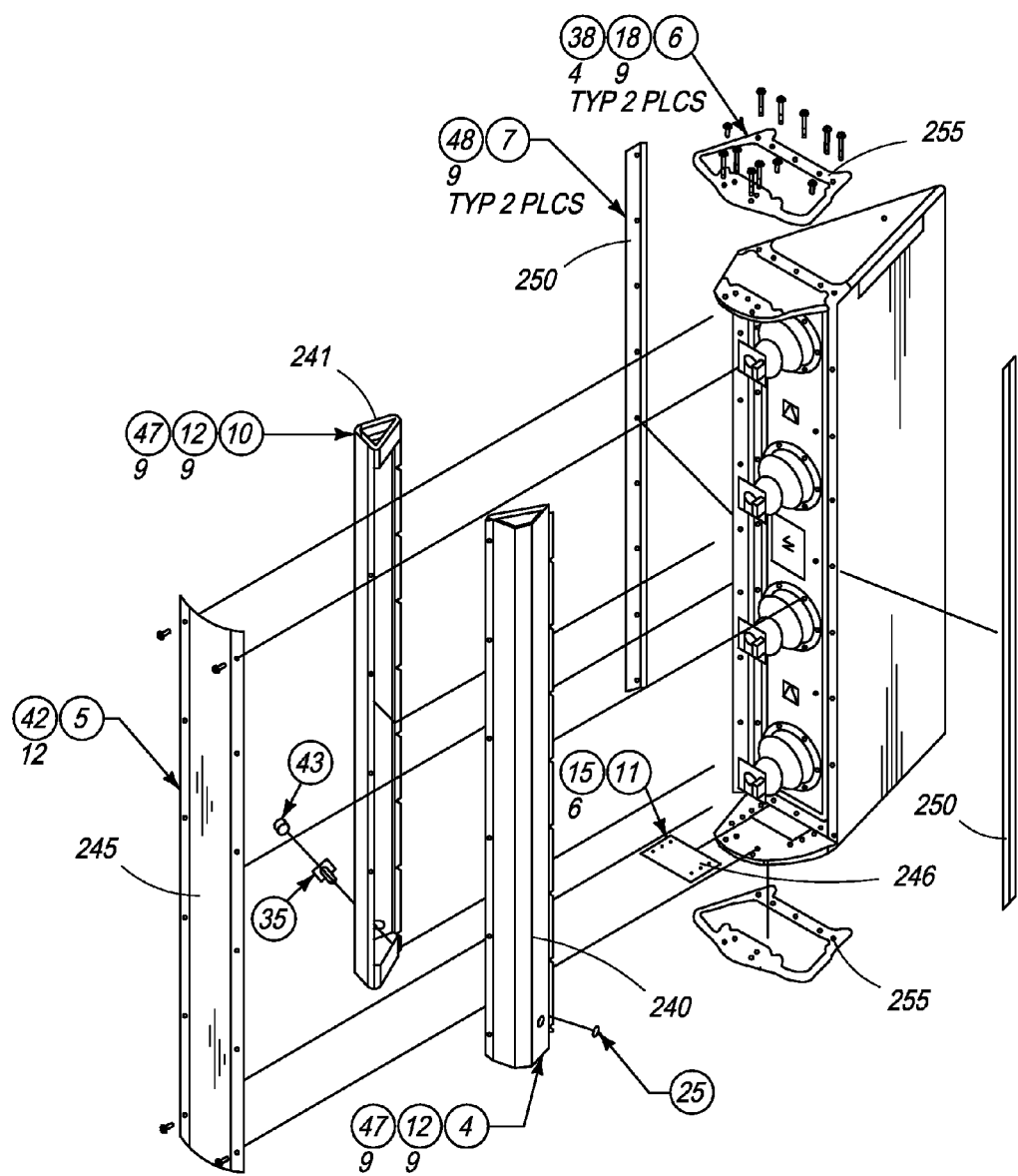
FIG. 2c shows an exploded view of the structures that cover the assembly of the photomultiplier tubes, mounting plate and signal processing card within the detector tower.

FIGS. 2a through 2c show structural details of the detector towers in accordance with one specific embodiment of the present invention. Specifically, FIG. 2a shows perspective views of identical detector towers 210 and 220 along with their respective front views 205, top view 215 and side view 216. In one embodiment, the towers have a height 'h' of 67 inches, lateral width 'w' of 30 inches and maximum thickness T of 16 inches.

Referring now to exploded views of the detector towers in FIGS. 2b and 2c, simultaneously, the mounting plate 225 is shown as "broken-away" and separate from the four photomultiplier tube assemblies 230 that are mounted on the plate 225 when assembled. In accordance with an embodiment of the present invention, back-end electronics of the photomultiplier tubes 230 comprise a signal processing board 235 co-located on the mounting plate 225 in proximity to the photomultiplier tubes.

At least one analog to digital conversion card and a power supply module is mounted on the signal processing board 235. The power supply module applies an operating voltage to the photomultiplier tubes while the analog to digital conversion card converts pulse current output from the photomultiplier tubes into digital signals for further processing. Conventionally, massive cables are employed to connect the photomultiplier tubes with a central analog-to-digital converter and power station located at a distance from the photomultiplier tubes. By having power supply as well as analog-to-digital converter closer to the photomultiplier tubes, smaller wires are needed thereby also reducing signal transient noise and improving the overall signal-to-noise ratio (SNR).

Referring again to FIGS. 2b and 2c, simultaneously, a seal 226 allows the assembly comprising mounting plate 225, photomultipliers 230 and signal processing board 235 to fit tightly into the corresponding tower premise 227. An interconnectable set of structures cover, both protect and allow easy access when needed to the photomultiplier tubes located on the mounting plate assembly. These set of structures comprise a corner cover 240 with a connector corner cover 241; a closure cover 245 with a corresponding connector 246; two trim side plates 250 and top and bottom handle frames 255.

Referring back to FIG. 1, in one embodiment, the inspection system 100 has modular components that can be disassembled for mobility and ease of transportation and reassembled again at the site of interest. Thus, the teardrop-shaped detector towers 110, 120 and the radiation source housing 165 with associated electronics and cables are manufactured as separate modules or cabinets that can be integrated quickly to form the system 100. The novel teardrop modular architecture enables a compact and light overall system 100.

FIG. 3a shows a disassembled view 300a of the screening system of the present invention such that its modular components, such as detector towers 310, 320 along with radiation source housing 365, are unassembled and packaged for ease of transportation. For example, the triangular cross-section of detector towers 310, 320 enables these to be packaged abutting each other in a way that requires minimal space for transportation. FIG. 3b shows an assembled view 300b of the screening system that has been constructed from the transportable package 300a of FIG. 3a. The modular components or cabinets of the screening system of the present invention are designed such that they have simple and intuitive points of connection, such as being able to be fastened to each other, via snap buttons, for quick assembly. In one embodiment, it takes less than 30 minutes to assemble/deploy the screening system from its transportable, packaged condition. In one embodiment, it takes approximately 15 to 30 minutes to assemble/deploy the screening system from its transportable, packaged condition. In one embodiment, the assembly/deployment time is dependent upon whether the unit must be heated or cooled to bring the unit to safe operating temperatures.

Figure 4:
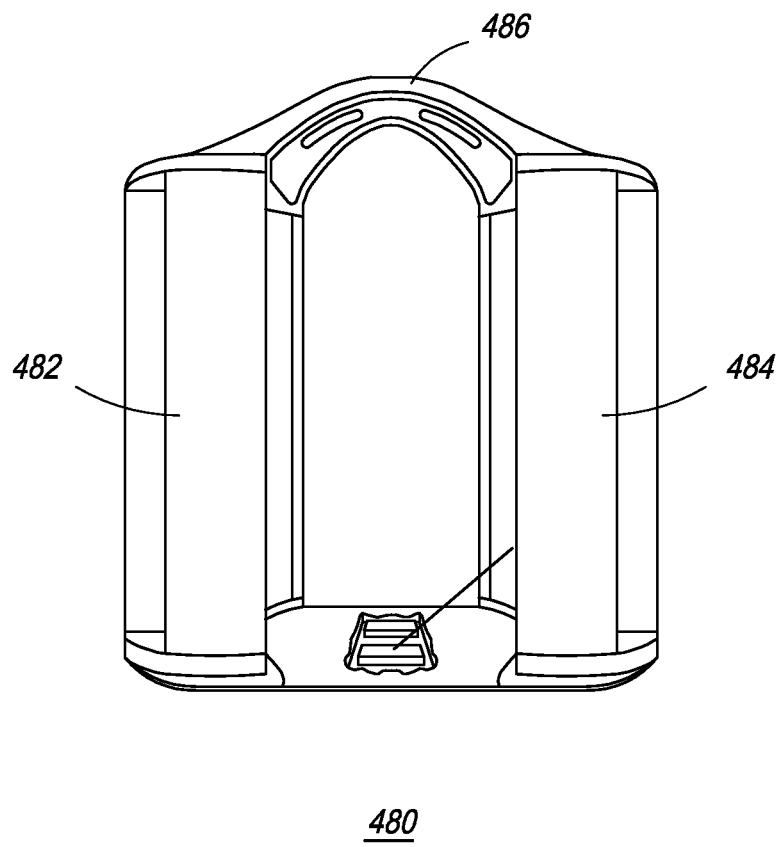
FIG. 4 illustrates an exemplary design of the screening system of the present invention.

FIG. 4 illustrates an exemplary design of the screening system of the present invention. The screening system 480 comprises a first detector panel 482, a second detector panel 484, a radiation source housing (not shown in FIG. 4) and a hood 486. Each detector panel 482, 484 comprises at least one detector tower such as described with reference to FIG. 1. The radiation housing comprises a radiation source such as the X-ray source described in conjunction with FIG. 1. The hood 486 is used to provide shelter when the screening system 480 is deployed at outdoor screening locations. Each of the components of the screening system 480, namely the radiation housing, the two detector panels and the roof are constructed as separate modular units that may be transported easily to a screening site and then be assembled rapidly.

In an embodiment, the radiation source housing is mounted on a dolly that is wheeled for transportation purpose. In this embodiment, the source module weighs 250 pounds and must be transported on the included dolly. In one embodiment, the source module is designed with most of the weight positioned near the wheels during transport so that the weight on the hands of the person pulling the unit is less than 60 pounds. In this embodiment, the total weight is approximately 520 pounds. In one embodiment, the dolly includes large diameter soft wheels for transport over rough terrain. In one embodiment, the dolly is designed so that it can be pulled up stairs.

In another embodiment, for a walk-by scanning machine, any single component of the screening system 480 weighs 88 pounds or less and can be transported by two man portable standard. In one embodiment, the walk-by machine can be disassembled into 5 separate components for ease of transfer. In one embodiment, each detector tower weighs less than 100 pounds, in particular 85 pounds or less, the base plate weighs less than 100 pounds, in particularly 85 pounds or less, the source module weighs less than 100 pounds, in particular 88 pounds or less, and the electronics enclosure weighs less than 100 pounds, and in particular 70 pounds or less. The total weight of the entire screening system is less than 500 pounds and, in one embodiment, is equal to 413 pounds. In this embodiment, no components contain wheels and no wheeled dolly is included since all components satisfy the two man portable requirement. It should be appreciated that this modular construction can be applied to a system for screening a stationary person as well.

In an embodiment, the components of the screening system 480 are packaged in a container which enables easy loading onto the back of a vehicle such as a multi-utility van. In another embodiment the components are designed having a rectangular frame that is stackable together enabling ease of transport.

As described above, in an exemplary embodiment, the detection system of the present invention is implemented as a walk-through detection system. The novel design of the system enables utilization of low-level radiation doses to detect weapons and dangerous materials, regardless of whether they consist of metal or low Z materials. This portal configuration can accommodate a high throughput of people as compared to the prior art because each person being screened simply walks through the portal.

Further, the screening system of the present invention is designed to have rugged enclosures enabling use in areas where portability and ruggedness are important considerations. The screening system of the present invention can be deployed quickly at indoor or outdoor temporary checkpoint screening locations. In an embodiment, the screening system has four identical ambidextrous cases weighing approximately 70 lbs each. For transportation, two cases are bound together with strapping so that the entire system is either hand carried or wheeled by two operators to the inspection site. In various embodiments, the modular components of the screening system can be either fork lifted or man lifted into a truck. The components can also be picked up with a helicopter. In an embodiment, the rectangular stackable frame of the components of the screening system acts as shipping crate and enables easy transportation.

Figure 5:
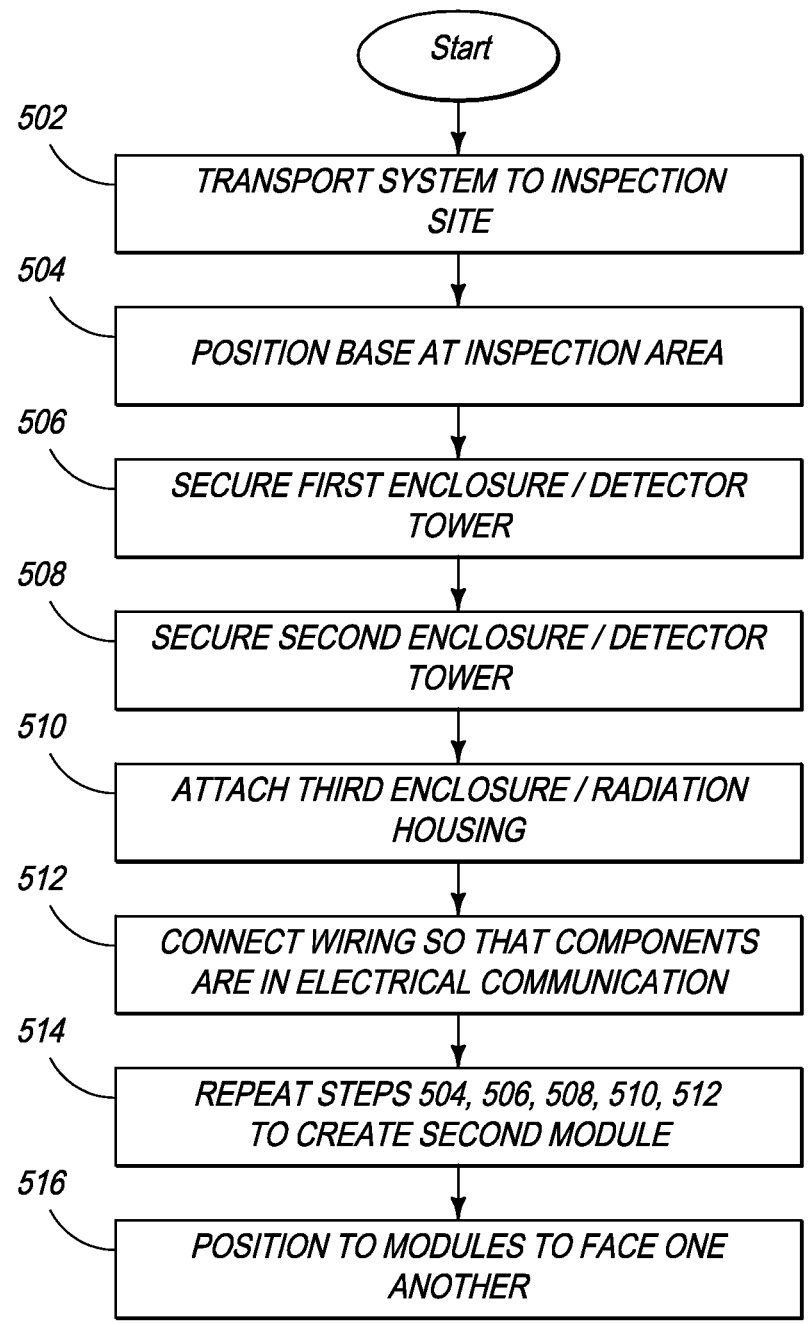
FIG. 5 is a flow chart describing one embodiment of the installation or deployment process of the scanning system of the present invention.

FIG. 5 is a flow chart describing one embodiment of the installation or deployment process of the scanning system of the present invention. In one embodiment, in order to install or deploy the system of the present invention, various components are first transported, in step 502, to an inspection site. Thus, the first enclosure, comprising a first detection system configurable to detect radiation scattered from a person; the second enclosure, comprising a second detection system configurable to detect radiation scattered from a person; a third enclosure, comprising an X-ray source assembly having an X-ray source, beam forming apparatus, motor, and elevation mechanism; and a base are all transported to the inspection site. In one embodiment, the components are transported to the inspection site as shown in FIG. 3*a*.

In one embodiment, in step 504, the base is positioned in the inspection area. In step 506, the first enclosure (detector tower) is connected to the base. In step 508, the second enclosure (detector tower) is connected to the base. In one embodiment, to fasten the detector towers to the base, large diameter shoulder bolts are pre-fastened to the base, such that the detector towers can be "twisted" and locked onto the base using the shoulder belts.

Thereafter, the third enclosure, comprising a radiation source and housing, is fastened to the base. The third enclosure comprises a first angled side and second angled side (described in detail with respect to FIG. 1), that easily abut and coincide with the sides of the first and second enclosures when assembled. Once the radiation source and housing is attached to the base, the detector towers cannot be moved and twisted off.

Once all enclosures are twisted into place on the shoulder bolts, all wiring is connected, and specifically, a wire carrying a digital signal output from the first enclosure containing a detection system and a wire carrying a digital signal output from the second enclosure containing a detection system are connected to a signal processing system.

Finally, the X-ray source assembly is placed in electrical communication with the signal processing system, resulting in one-half of the system, as shown in FIG. 3*b*.

In step 514, steps 504, 506, 508, 510, and 512 are repeated to form the second side of the scanning module. In step 516, both modules are positioned such that they face one another, as shown in FIG. 4. Additionally, the modules are aligned to calibrate and/or synchronize the respective X-ray emissions and detection processes of both modules.

Besides being employed for screening of passengers at airports and railway stations, at open and crowded venues such as stadiums and shopping malls, applications of the system of present invention may be extended to inspecting the contents of vehicles and containers at transit points such as ports, border crossings and customs checkpoints etc. In an exemplary embodiment, the screening system is implemented as a 'drive-through' system, through which a cargo vehicle to be scanned can be driven, thereby providing a second axis of motion. The screening system of the present invention may also be used for medical purposes.

Figure 6:
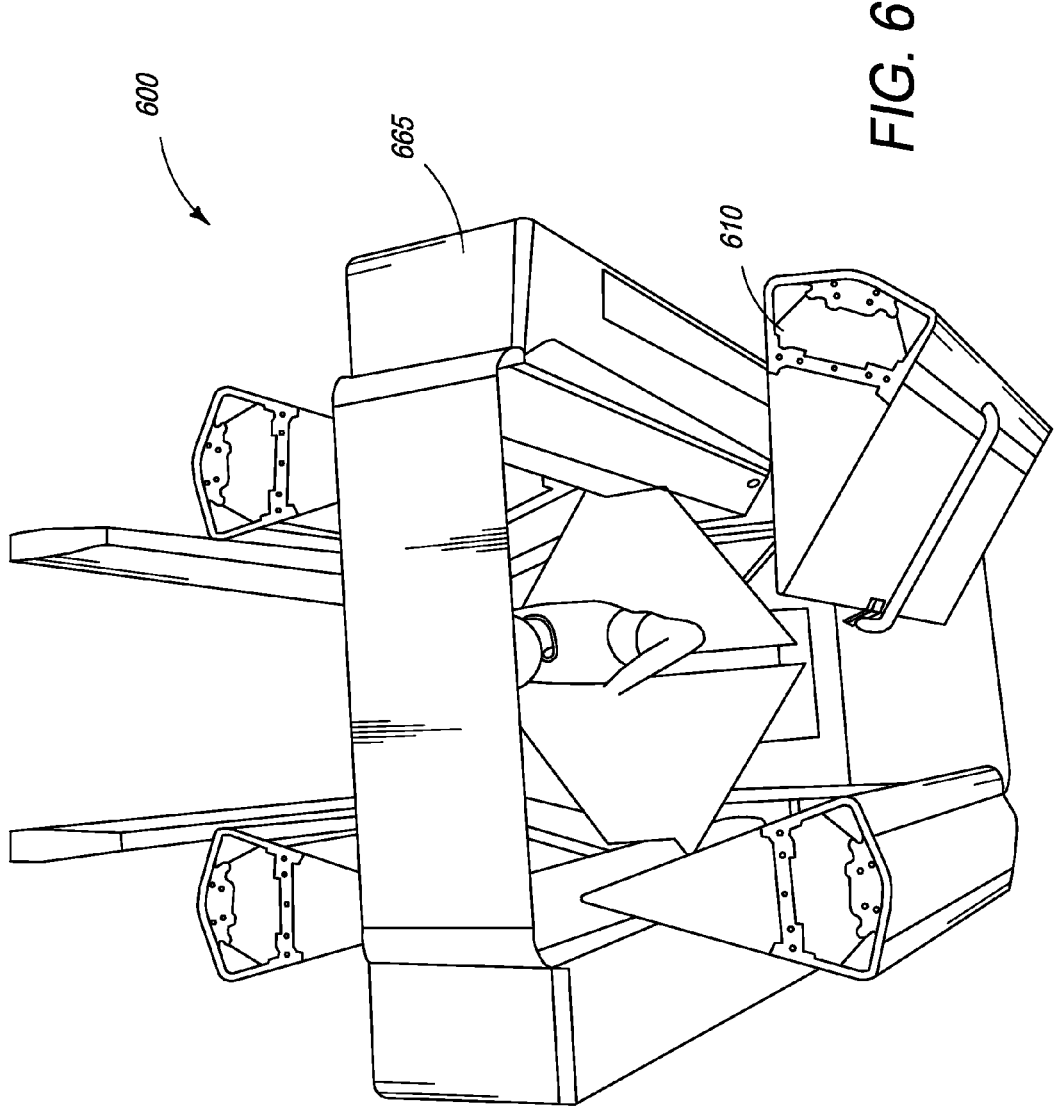
FIG. 6 illustrates a detector tower pulled apart from the radiation housing for ease of service access to the modular components of the screening system of the present invention.

Persons of ordinary skill in the art should appreciate that the modular components design of the screening system of the present invention also facilitates ease of service access for repair and maintenance. For example, FIG. 6 shows an assembled/deployed view 600 of the screening system of the present invention with detector tower 610 being pulled away from the radiation housing 665 for service access to the housing 665 and/or for selective repair and maintenance of the tower 610.

Referring back to FIG. 1, during operation, as the subject 103 walks-by or stands in front of the detector towers 110, 120 a part of the pencil beam 102 of X-rays that strikes the subject 103 are back-scattered, as rays 105 due to Compton scattering and impinge on the first screen 147 at the front side area 141 of the detector towers. While a portion of the scattered X-rays are detected by the first screen 147, some portion of theses get transmitted through the first screen 147 without being detected and impinge on the second screen 148 (at side 142) in the interior of the detector towers. In one embodiment approximately 40% of the X-ray photons impinging the first screen 147 are detected by it while approximately 24% of the remaining X-ray photons are detected by the second screen 148. It should be noted that these percentages may change, depending upon the energy of the x-rays and the thickness of the scintillator screen.

The photomultiplier tubes 150 generate electronic signals in response to detected rays that are initially converted into light. The light emitted by scintillation at screens 147, 148 is bounced around the triangular enclosures/towers 110, 120 until captured with the photomultiplier tubes 150.

The electronic signals produced by the two detector towers 110, 120 are directed to a processor. The processor analyzes the received signals and generates an image on a display means. The intensity at each point in the displayed image corresponds to the relative intensity of the detected scattered X-rays as the beam is rastered across the subject. In one embodiment, X-ray source 160 communicates synchronization signals to the processor. The processor analyzes the detected signals and compares them to the synchronization signals to determine the display image. In one embodiment, display means is a monitor and is employed to display graphical images signaled by the processor. Display means can be any display or monitor as commonly known in the art, including a cathode ray tube monitor, an LCD monitor or an LED monitor. In one embodiment, the digitized scatter image displayed by display means preferably consists of 480 rows by 160 columns with 8 bits per pixel.

In one embodiment of the present invention, in order to obtain 2D images of scattered radiation, detector systems make use of a dual-axis scanning beam.

In another embodiment of the present invention, a single axis scanning beam through which a target will walk is employed. The walking motion of the target provides the second axis of motion. Thus, at any one given instant where the subject under inspection 103 or target moves through the vertically moving pencil X-ray beam 102, the precise location of the beam is known via the motor that controls the chopper wheel (described in greater detail below). At each instant, the detector arrangement 106 provides the measured response of backscattered x-rays, the strength of which is represented in the resultant image. Because the system knows exactly where the pencil beam is located at every instant that the backscattered rays are detected, the image can be "stitched" together, to form the comprehensive image of the target.

Thus, in one embodiment, a fixed vertical scan beam constitutes one axis of motion and the intended subject provides the second axis of motion by walking or being conveyed through the vertical scanning beam. This configuration is advantageous because the single axis beam requires a very small rectangular opening at the detector panel. In current backscatter detection systems utilizing a dual axis scanning beam, the mechanical assembly requires a significant opening between the detectors to allow the scanning beam to exit. A significant opening is required because for a dual axis scanning beam system when the target is stationary (where a spinning chopper wheel provides one axis of motion and the vertical motion of this spinning chopper wheel provides the second axis of motion), the pencil beam of x-rays is projected in the horizontal direction. Thus, to cover a target the size of a person, the opening must be wider to allow the beam to cover an entire person. In addition, a conventional large sized opening allows a large portion of backscatter radiation to escape undetected.

As described above, in one embodiment of the present invention, the second axis of motion is provided by the moving target. Thus, the beam can be oriented for vertical motion to allow for a smaller opening and optimum detector positioning. Referring back to FIG. 1, and as described above, the single axis scanning system of the present invention incorporates a small rectangular opening 172 between detector regions 110 and 120 for the X-rays to emanate therefrom. Further, the small opening 172 makes it possible to position additional and/or larger detector panels in the direct backscatter path, thereby enhancing image quality.

As described above, pencil beam 102 is rastered either horizontally or vertically across the subject, by employing a beam chopping mechanism by only allowing a minimal exit aperture for the X-ray beam to project. In one embodiment, the beam chopping mechanism is a chopper wheel having three slits positioned at 120 degrees apart and aligned with two parallel collimator slits such that each chopper slit will leave one of the parallel collimator slits while another is just entering the opposite parallel slit. This creates two parallel scanning beams that are interleaved in time and can be processed separately even with a single common detector array, circuitry and processing, all using a single source which conically illuminates the two parallel slits.

Figure 7A:
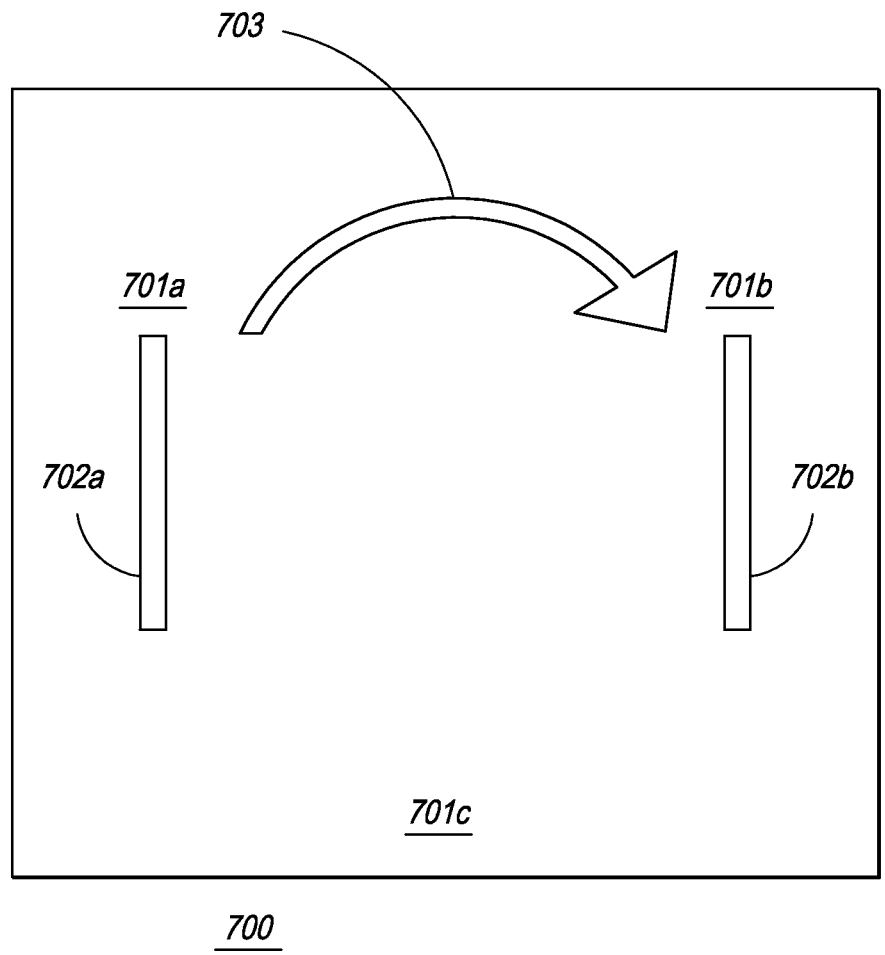
FIG. 7a illustrates a top view of an exemplary chopper wheel used in the screening system of the present invention.

FIG. 7a illustrates a top view of an exemplary chopper wheel 700 which can be used for obtaining a dual view (using two parallel, interleaved scanning beams) using a single source. The chopper wheel 700 has three slits, 701a, 701b and 701c, placed at an angular distance of 120 degrees from each other. There are also two parallel collimator slits 702a and 702b. Arrow 703 depicts the direction of motion of the chopper wheel, which in this embodiment is clockwise. This arrangement creates two "staggered" parallel scanning beams which, as mentioned earlier, are interleaved in time and can thus be processed separately using common detectors, circuitry and processing components.

Figure 7B:
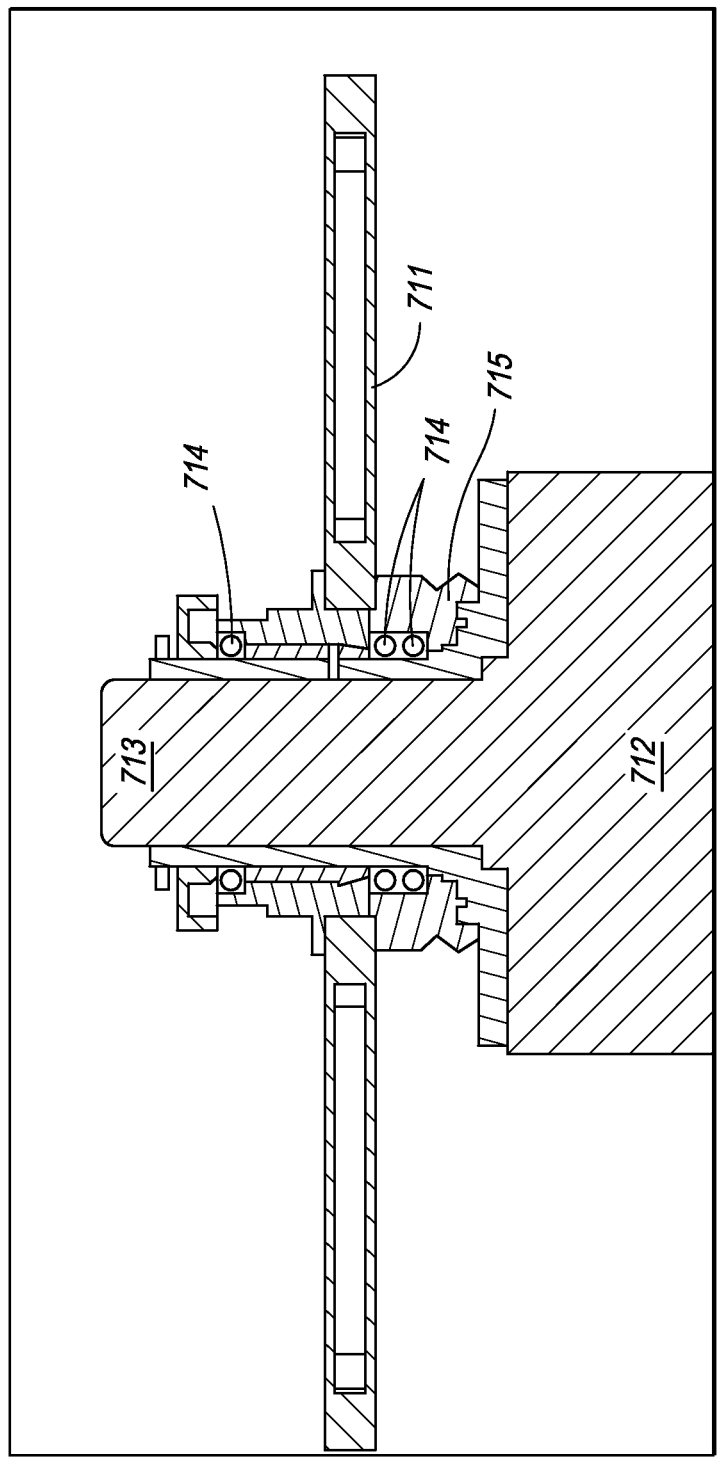
FIG. 7b illustrates an exemplary disk chopper assembly, with integrated electromagnetic motor and bearings.
Figure 7C:
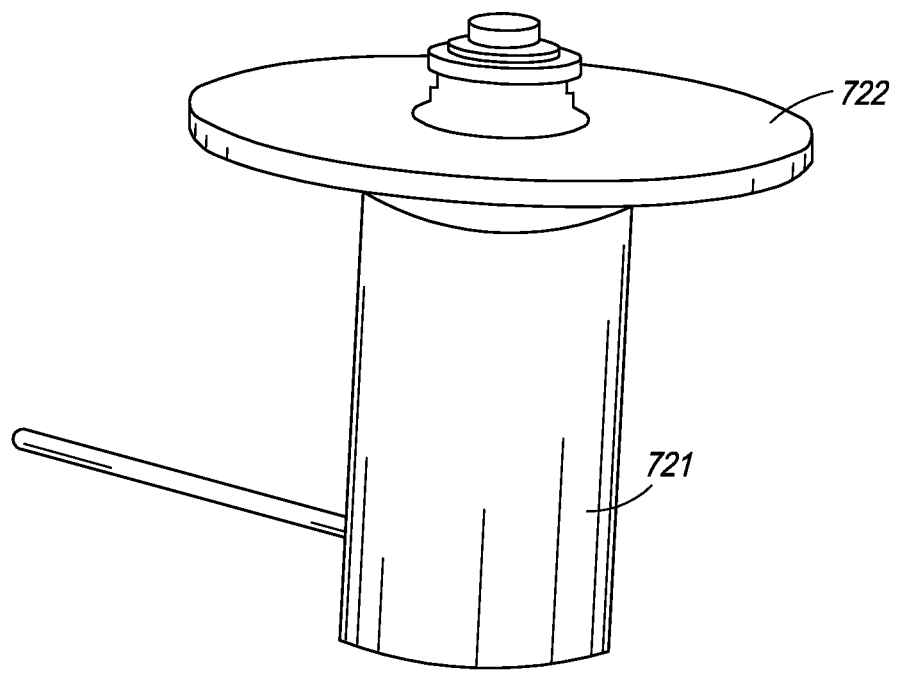
FIG. 7c illustrates an X-ray source coupled to a disk chopper, according to one embodiment of the present invention.

In one embodiment, the disk chopper assembly is dynamically controlled for rotation using an electromagnetic motor drive. FIG. 7b illustrates an exemplary disk chopper assembly, with integrated electromagnetic motor and bearings. Referring to FIG. 7b, the disk chopper 711 is coupled to the radiation source 712, which, in one embodiment, comprises an X-ray tube. The electromagnetic motor 713 is integrated with the X-ray tube 712 and the chopper 711. The motor assembly further comprises three compression bearings 714, and a V-groove 715 for belt drive backup. FIG. 7c illustrates the X-ray tube (source) 721 coupled to the disk chopper 722, minus the motor assembly.

In one embodiment, the X-ray inspection system further comprises a reference detector that compensates and monitors each emitted beam and further functions as a radiation monitor for monitoring emitted radiation within the inspection region. The reference detector is, in one embodiment, positioned within the beam path before the beam chopping apparatus, such as the beam chopper disk. The reference detector may also be positioned after the beam chopping apparatus, such as the beam chopper disk, at the beginning of the formed scanned line. In such a case, the radiation detector may acceptably block the first 2 degrees of the beam.

Figure 8A:
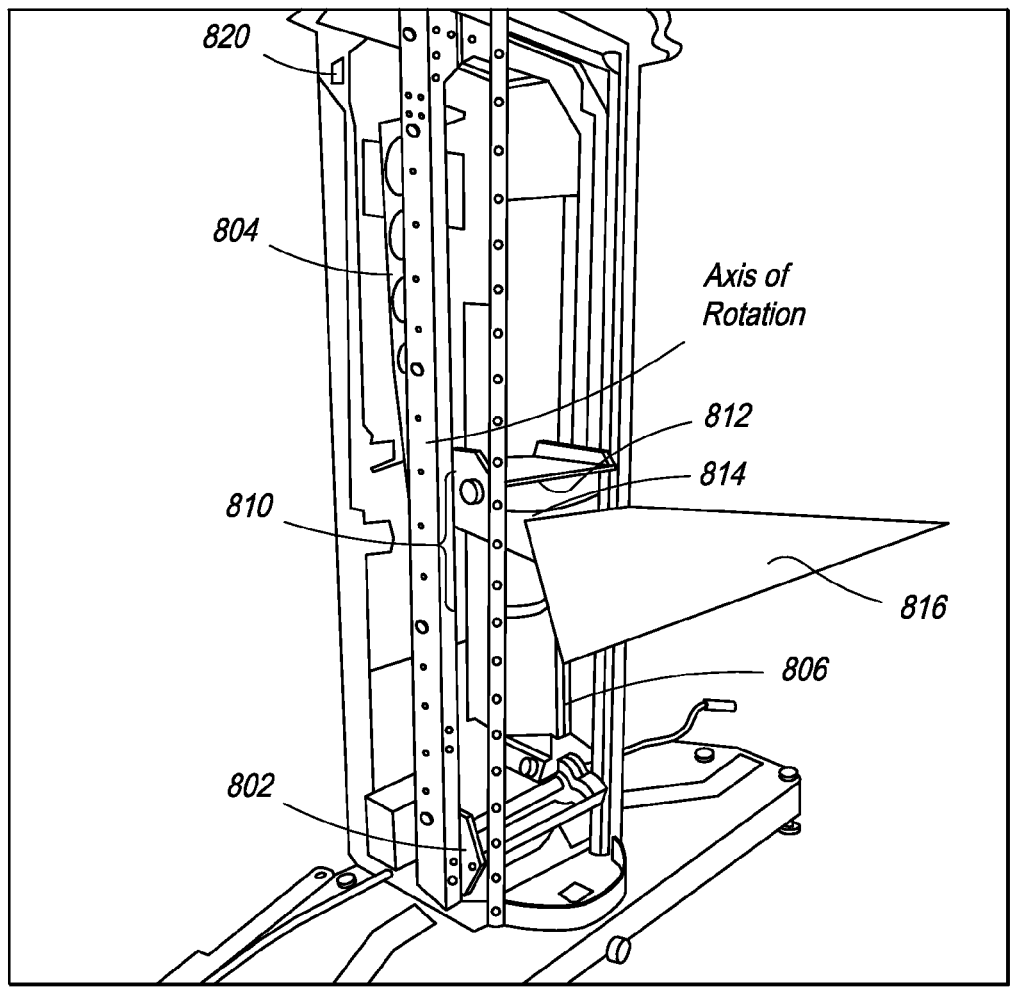
FIG. 8a illustrates an X-ray source being used in conjunction with a chopper wheel in an exemplary threat detection system, further showing a tilt "CAM" mechanism coupled to a source.

FIG. 8a illustrates an X-ray source being used in conjunction with a chopper wheel, as described in FIGS. 7a, 7b, and 7c, in an exemplary threat detection system. The source and chopper wheel are couple to a tilt "CAM" mechanism such that it enables substantially equal spacing between scan lines throughout the vertical motion of the x-ray beam. Referring to FIG. 8a, the module comprises a tilt CAM mechanism 802 coupled with an x-ray source assembly 810 all housed on frame 820. The tilt CAM mechanism 802 further comprises CAM guide 804. In addition, also housed on frame 820 is a motor for driving CAM mechanism and the belts used to lift the source. In one embodiment, a handle is attached to the source assembly 810 for enabling fitting in and removing the source assembly from the metal CAM guide frame 804. In various embodiments, all parts of the source assembly are securely attached by using predefined sizes of nuts, screws and clamps. In addition, lift belt 806 is provided to further enable lifting and counterbalancing of the source.

Figure 8B:
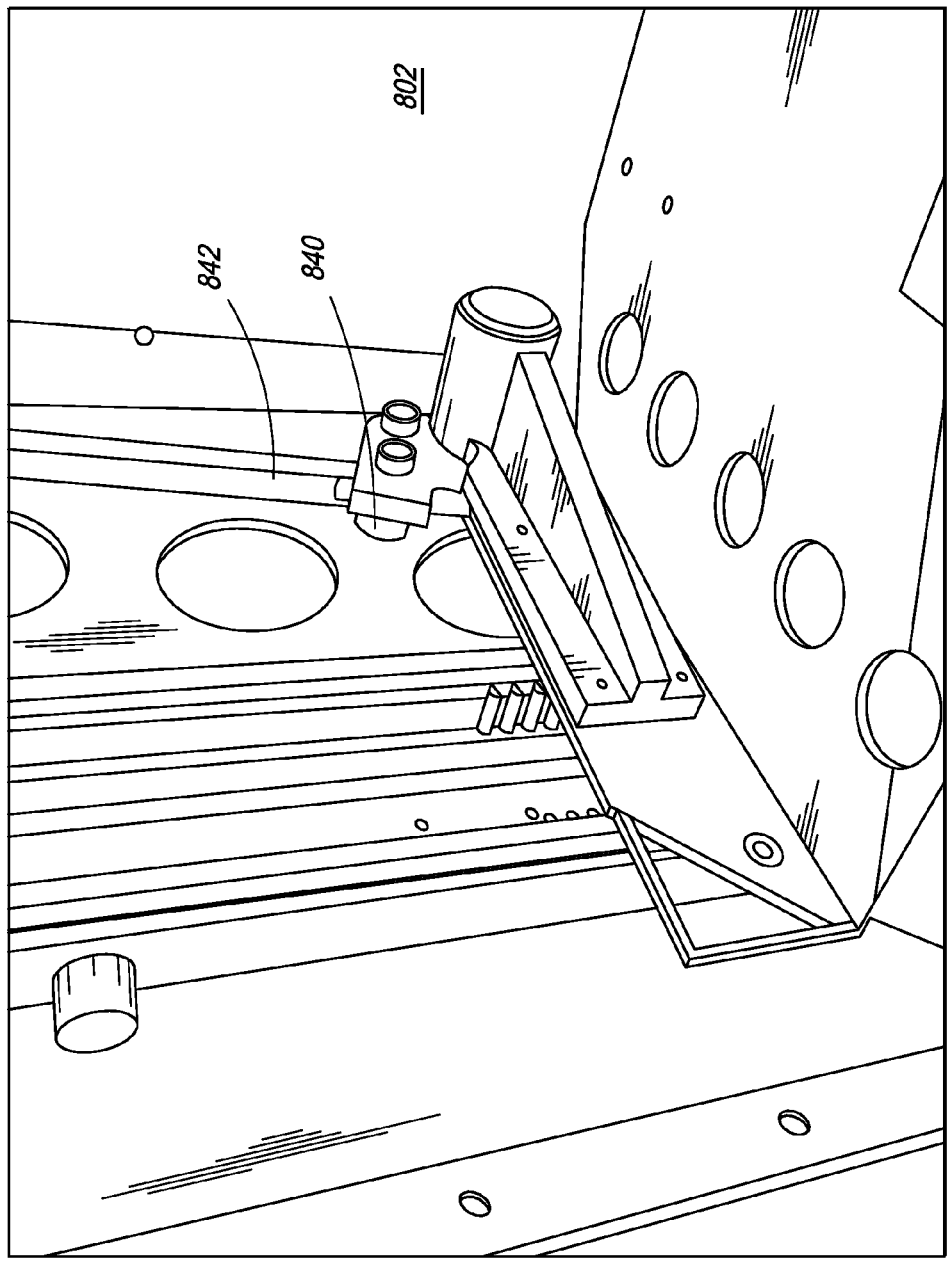
FIG. 8b shows a diagram of the metal frame title CAM mechanism in an expanded view, further showing the drive wheel up against a CAM arm, such that it enables vertical motion of the source.

FIG. 8b shows a diagram of the tilt CAM mechanism 802 in an expanded view, further showing drive wheel 840 abutted up against CAM arm 842 such that it enables vertical motion of the source.

In another embodiment, a counterweight is employed to counterbalance the source and reduce stress on the lifting motor. In another embodiment, two lift belts may be employed to balance the source, eliminating the counterbalance and resulting in a much lighter source. In another embodiment, a gear reducer (15:1 reduction) and higher torque motor may be employed to eliminate the use of a counterbalance, as the source now seems 15 times lighter to the motor. However, the motor, in this case, would have to turn 15 times faster to achieve the same radiation pattern.

Figure 8C:
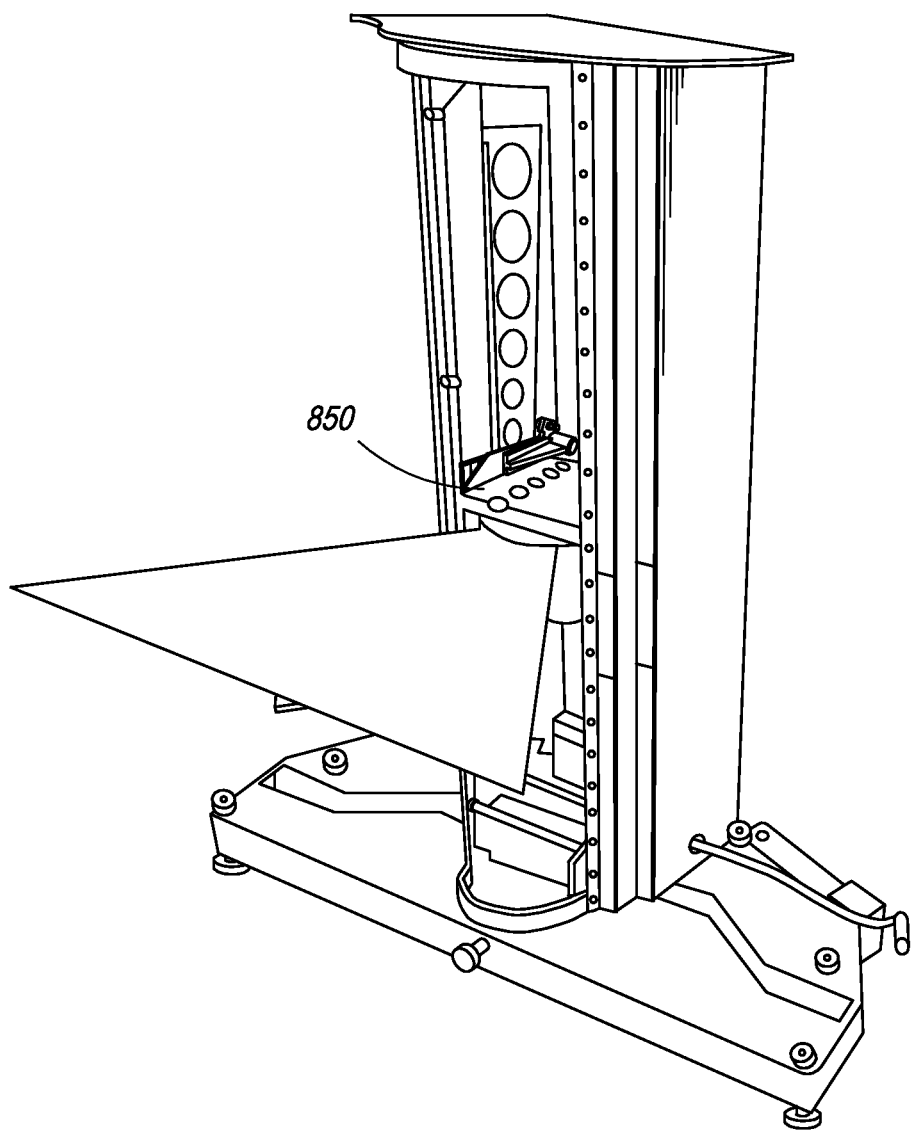
FIG. 8c illustrates another view of the module illustrated in FIG. 8a, further showing a rotating platform to rotate the source and corresponding power supply.

Referring back to FIG. 8a, the source assembly 810 comprises an X-ray source 812 and a disk wheel chopping mechanism 814 made of a suitable material such as metal or plastic for guiding the X-rays 816 generated by the X-ray source in a desired direction. In one embodiment, source assembly 810 also comprises a high voltage power supply enabling the operation of the source assembly. In an embodiment, the X-ray source 812, along with beam chopping mechanism 814, generates a narrow pencil beam of X-rays which are directed towards a subject under inspection through source rotation or beam traversal to create a scan line. In one embodiment, the disk wheel chopping mechanism 814 is optionally coupled with a cooling plate, which dissipates heat generated by the rotating chopper wheel. FIG. 8c illustrates another view of the module illustrated in FIG. 8a, further showing a rotating platform 850 to rotate the source and corresponding power supply.

It should be understood by persons having ordinary skill in the art that radiation sources are typically very heavy. In order to accommodate for the weight of the X-ray source, a chopper wheel configuration, as employed above, has to be rather large, and thus contributes to the overall weight of the system. Therefore, in another embodiment, the screening system of the present invention is equipped with a spin-roll chopper that is designed to present a helical profile aperture shutter for X-ray beam scanners and that is lightweight and easy to deploy. In addition, the use of the spin-roll chopper obviates the need for source rotation, rather the beam traverses from −45 to +45 degrees.

In one embodiment, the spin-roll chopper allows for variability in both velocity and beam spot size by modifying the physical characteristics or geometry of the beam chopper apparatus. In addition, the spin-roll chopper provides a vertically moving beam spot with constant size and velocity to allow for equal illumination of the target and creates a wider field of view during operation.

Figure 9A:
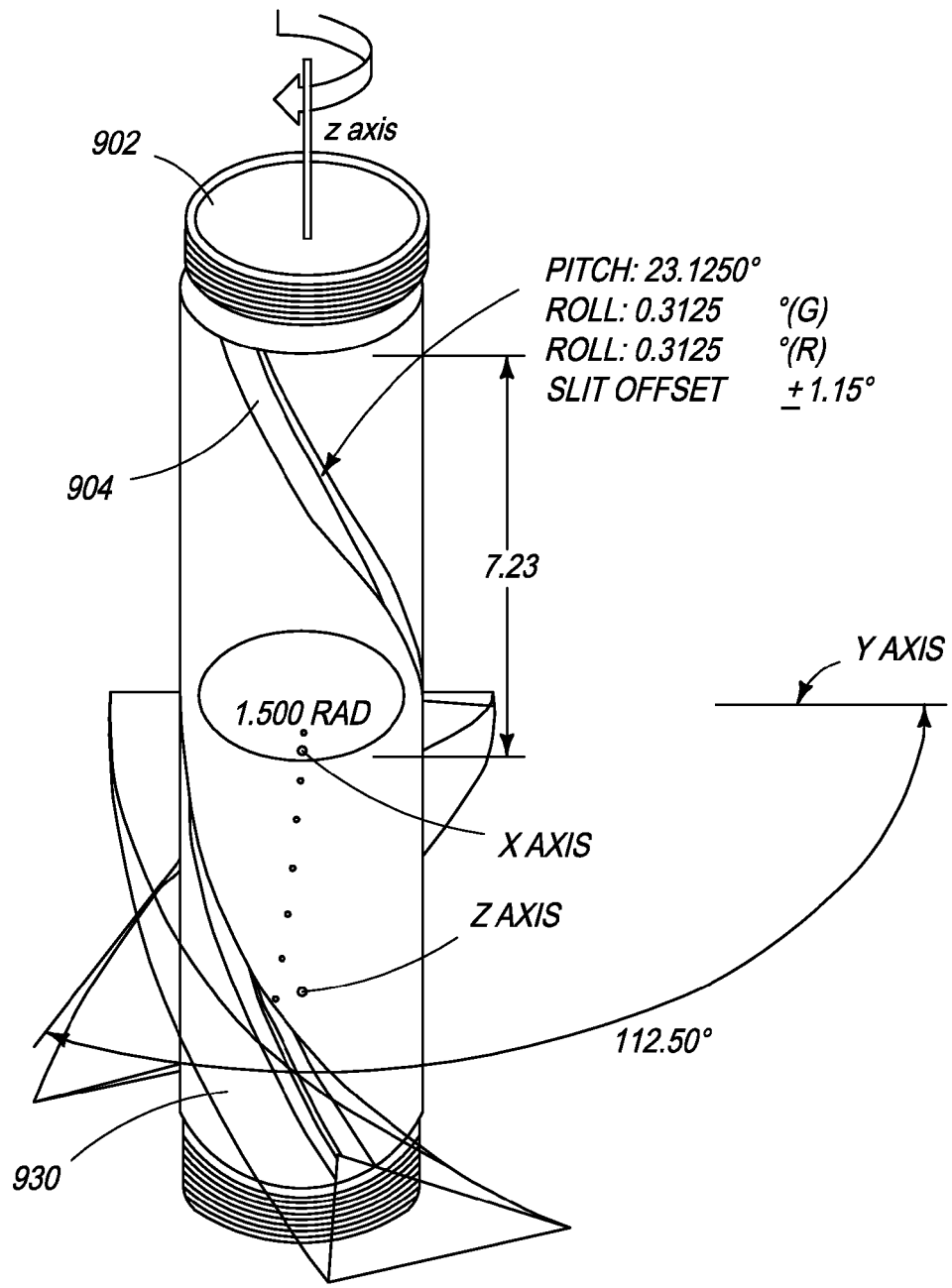
FIG. 9a is a mechanical illustration of an exemplary design of one embodiment of an exemplary beam forming apparatus.

FIG. 9a illustrates an exemplary design for one embodiment of the spin-roll chopper, as used in various embodiments of the present invention. Beam chopper 902 is, in one embodiment, fabricated in the form of a hollow cylinder having helical chopper slits 904. The cylindrical shape enables the beam chopper 902 to rotate about the Z-axis and along with the helical apertures 904, create a spin-roll motion.

Thus, an X-ray beam scanner employing the spin-roll chopper of the present invention effectuates beam chopping by rotating the hollow cylinder 902 machined with at least two helical slits 904, which enables X-ray beam scanning with both constant and variable linear scan beam velocity and scan beam spot size. The spin-roll chopper enables both constant and variable linear scan beam velocity by manipulating the geometry of the helical apertures. In one embodiment, the velocity is varied or kept constant by manipulating the pitch and roll of the helical apertures along the length of the spin-roll chopper. Thus, it is possible to have a constant speed or to slow the scan down towards areas where more resolution is desired.

The spin-roll chopper also enables variable and constant beam spot size by manipulating the geometry of the helical apertures, thus varying the resultant beam power. In one embodiment, it is possible to manipulate the actual width of the aperture to alter the beam spot size. In one embodiment, the width of the helical aperture varies along the length of the spin-roll chopper cylinder to compensate for the varying distance of the aperture from the center of the source and allow for uniform beam spot projection along the scan line. Thus, in one embodiment, the farther the aperture is away from the source, the narrower the width of the helical aperture to create a smaller beam spot size. In one embodiment, the closer the aperture is to the source, the wider the helical aperture to create a larger beam spot size.

When employed in a body scanning system, it is possible to vary the pitch and roll and width of the helical apertures such that more beam scanning power is directed towards areas of the body (hair, feet, etc) that require more detail and resolution and less power is directed towards areas of the body (midsection, etc.) that are more sensitive to radiation.

Helical slits 904 also ensure that the projection of the X-ray beam is not limited by the dual collimation of the two slits. As described in greater detail below, dual collimation refers to the concept whereby the X-ray beam will pass through two helical slits at any given point in time. The resultant X-ray beam trajectory 930 is also shown in FIG. 9a and described in greater detail with respect to FIG. 9c below.

In an embodiment of the present invention a plurality of viewing angles ranging from sixty degrees to ninety degrees can be obtained through the helical slits in the spin-roll chopper. In one embodiment, the scan angle is a function of the distance between the spin-roll chopper and both the source and the target. In addition, the overall height and diameter of the spin-roll chopper affects the viewing angle. The closer the spin-roll is placed to the source, the smaller the spin-roll chopper will need to be and similarly, the farther the spin-roll chopper is placed from the source, the larger the spin-roll chopper would need to be.

Figure 9B:
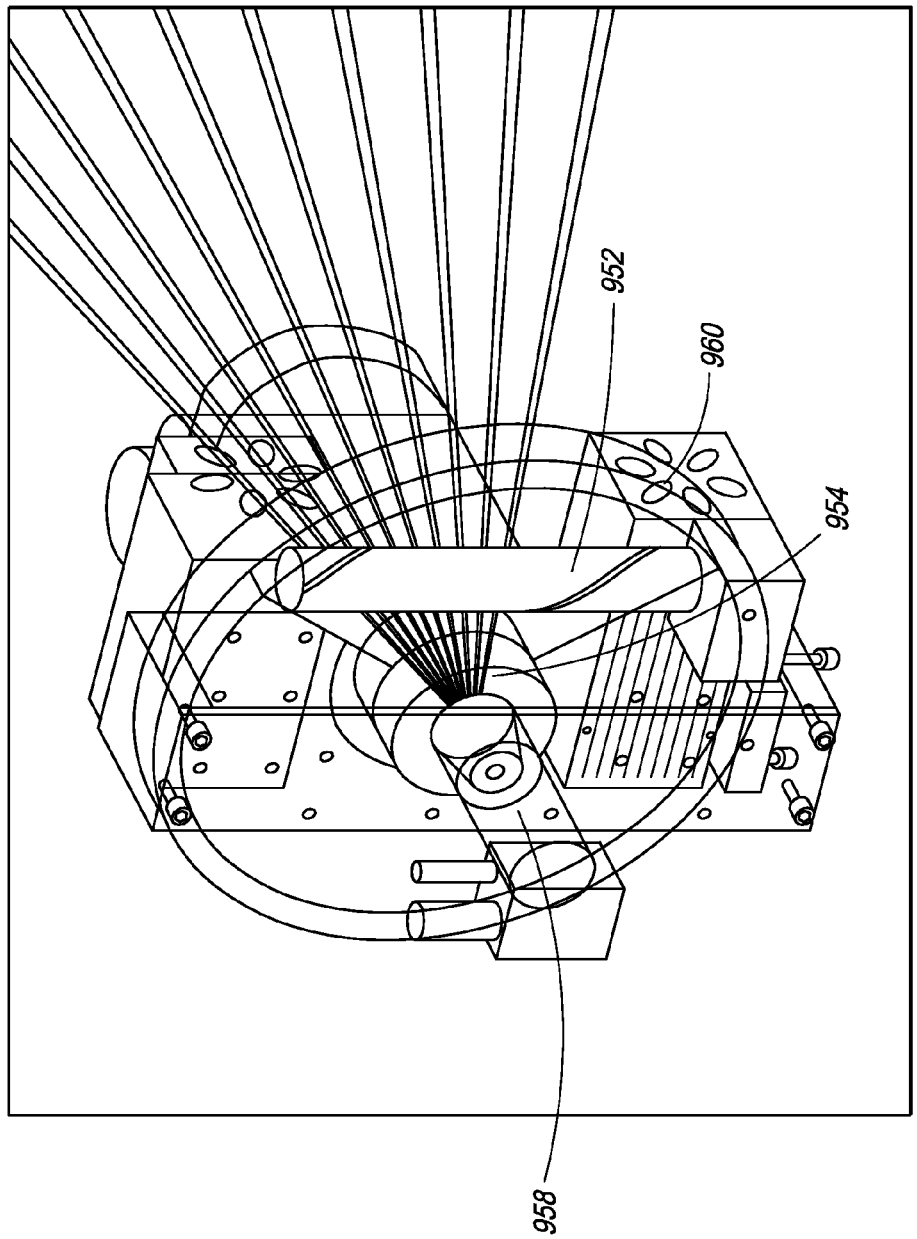
FIG. 9b illustrates an exemplary beam forming apparatus with an X-ray source.

FIG. 9b illustrates a beam chopping mechanism using the spin-roll chopper described with respect to FIG. 9a. Referring to FIG. 9b, the cylindrical spin-roll chopper 952 is placed in front of a radiation source 954, which, in one embodiment, comprises an X-ray tube. In one embodiment, rotation of the chopper 952 is facilitated by including a suitable motor 958, such as an electromagnetic motor. In another embodiment, as described in greater detail below, magnetic bearings are employed to facilitate rotational movement of the spin-roll chopper of the present invention. The speed or RPM of rotation of the spin-roll chopper system is dynamically controlled to optimize the scan velocity. In one embodiment, the spin-roll chopper system is capable of achieving speeds up to 80K RPM.

In one embodiment, a radiation shield is provided on radiation source 954 such that only a fan beam of radiation is produced from the source. The fan beam of radiation emits X-rays and then passes through the spin-roll chopper, which acts as an active shutter. Thus, there is only a small opening when the spin-roll chopper, and therefore helical apertures are rotating, which provides the moving flying spot beam.

FIG. 9b also shows a disk chopper wheel 960 superimposed upon the source along with the spin-roll chopper. It can be seen from FIG. 9b that chopper wheel 960 is substantially larger than spin-roll chopper 952.

In accordance with an embodiment of the present invention, at certain distances from the center of the beam, the helical slit (of the spin roll chopper) is kept wider than others. FIG. 9c shows a mathematical expression of the trajectory 970 of the beam using a single source, in accordance with one embodiment. In order to get the dimensions of the helical cuts in the spin-roll cylinder, one dimension of this trajectory was removed. More specifically, the slit is narrower at the top 975 because there is a greater distance for the beam to travel. Note that when an X-ray beam travels through any opening, the beam is collimated. The farther the beam travels, the wider the resultant "spot" (fan beam) is at the end of the beam. By making the slit narrower at the top 975, this greater distance and beam widening is accounted for. In addition, the slit is made wider where the distance to the object is shorter, such as at point 980. Also, persons of ordinary skill in the art should appreciate that by controlling the size of the slit one can control the density of the beam that is projected straight through.

U.S. Provisional Patent Application No. 61/313,772 entitled "Walk-Through People Screening System" and filed on Mar. 14, 2010, and its corresponding children applications are incorporated herein by reference in their entirety.

The system of the present invention is designed such that the distance of the beam chopping mechanism from the target is directly correlated with a minimum scan height. This allows for longer distance from source to the target, thereby extending the depth of field with respect to dose rate to the target. Therefore, for a given depth of imaging, a smaller radiation dose is required with the system of the present invention as compared to other systems known in the art.

It should be appreciated that the inspection system is capable of imaging both metal and non-metal objects (including explosives and non-metal weapons) on a person (including within or under clothing) without the removal of clothing and is capable of processing generated images to only show a body outline and highlight threatening or illegal objects, including both organic and inorganic materials, while hiding private body features, thereby creating a privacy image. The inspection system is configurable such that only the privacy image will be available to the operator. Alternatively, the system may be configurable such that the privacy image is the default image but the raw image, generated prior to processing to only show a body outline and threatening or illegal objects, is still available to the operator.

Additionally, in one embodiment, the system a) comprises an internal safety monitoring circuit to continually monitor safety of system and radiation levels during each scan, b) provides an ionizing radiation dose no greater than 5 microrem per scan to any person under inspection, c) scans one side of a person in 8 seconds or less, d) shall have a length no greater than 125 cm (length dimension faces person under scan), e) shall have a width no greater than 100 cm, f) shall have a height no greater than 205 cm, g) shall have an optional wall to aid in privacy of the subject being screened and prevent interference from the background, which will enhance the detection capabilities of the system by making inorganic objects on the side edge of the body more visible in the image and permit full coverage of the body in 2 scans as opposed to 4 scans when the wall is not used, h) shall have an optional communications monitor to facilitate communications between a remote inspector and a local operator and to communicate an image outline of the real body instead of the stick man or a simplified, i.e. "stick man", image with search locations highlighted therein where the image is "calibrated" to adjust for varying body heights of persons relative to the body height of the stick man, i) shall be able to scan a six foot person standing 10 inches away, measured from the detector wall to the person's nose, j) shall be capable of communicating to a workstation deployed remote from the scanning system, k) shall be possible to initiate a scan from the remote workstation, l) can be configured to a predefined number of scans per person which shall complete before incrementing to the next person, m) shall permit extra scans to be taken, as an option available to an operator, before incrementing to the next person, n) shall be configurable to force an operator to pass or clear each scan independently, even if multiple scans are required of the same person, o) shall communicate scan results (pass or fail) to a remote operator via visual light indications, which can be remotely viewed by the remote operator, on the local system, i.e. a red light for "fail" and a green light for "pass", p) shall be able to report what operator was logged into the system during which time period and how many persons were scanned by the operator during such period, how many total persons were scanned during each hour of the day, and the number of scans and number of persons scanned in any predefined time period (such as hour, day, or month), q) shall have the option of a training simulator with an image library of at least 100 training images, r) can scan a stationary object having a height of 6 feet 8 inches, or six feet six inches, or less and a width of 45 inches, or 41 inches, or less, and s) can perform scans in 20 seconds, and more preferably 10 seconds, or less. U.S. Pat. No. 7,110,493 is hereby incorporated by reference.

Image processing software of the detection system of the present invention makes use of appropriate algorithms to reconstruct images such as combining separate front and rear images to create a complete image, as well as for image analysis to determine threats. In one embodiment, a segmentation algorithm is used to distinguish threat objects.

U.S. Pat. No. 7,796,733 entitled "Personnel Screening System with Enhanced Privacy" and assigned to the applicant of the present invention is herein incorporated by reference in its entirety. In addition, U.S. patent application Ser. No. 12/849,987, entitled "Personnel Screening System with Enhanced Privacy" and assigned to the applicant of the present invention, is herein incorporated by reference in its entirety. U.S. patent application Ser. No. 12/142,978 entitled "Systems and Methods for Improving Directed People Screening" and assigned to the applicant of the present invention is herein incorporated by reference in its entirety.

Figure 10:
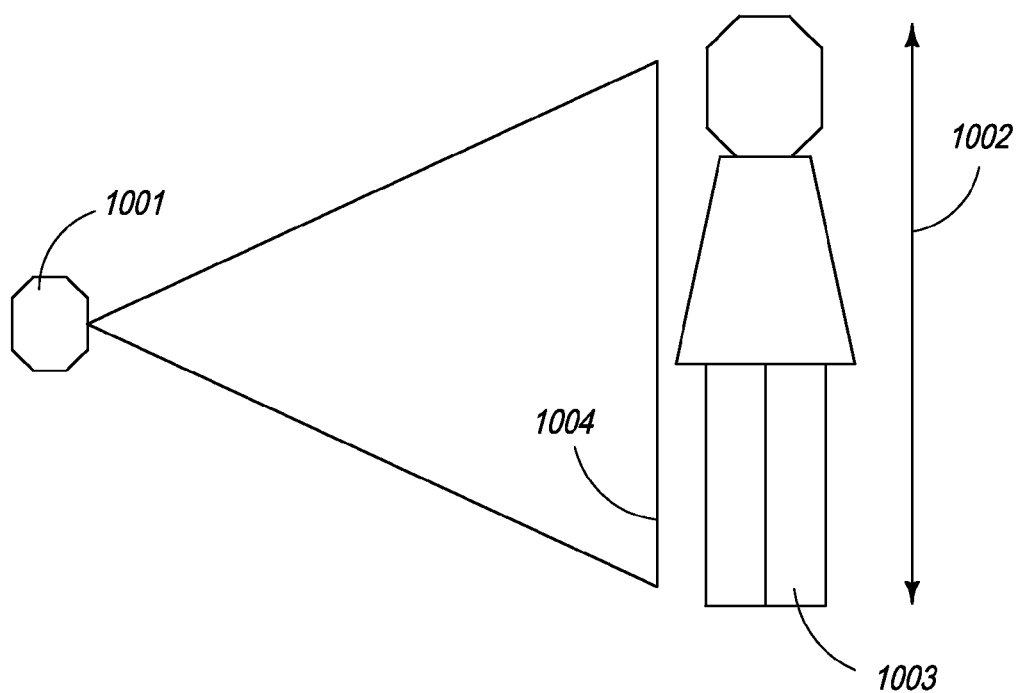
FIG. 10 is a side view diagram illustrating vertical scanning using a single radiation source; and, FIG. 11 shows the top view of an exemplary screening arrangement used in the present invention.

As mentioned earlier, with respect to FIG. 1, the design of the present invention allows for more detector panels to exist in the direct backscatter path, thereby contributing to image quality. The image quality is increased further in another embodiment, by using an approach that increases the area of the detection field and the number of detectors that can be employed. This novel approach is described with reference to FIGS. 10 and 11. FIG. 10 illustrates a side view showing vertical scanning with a single source 1001. In this configuration, the height 1002 of a subject 1003 that can be scanned using the single source 1001 is limited by the view width 1004 or the illumination span of the source.

Figure 11:
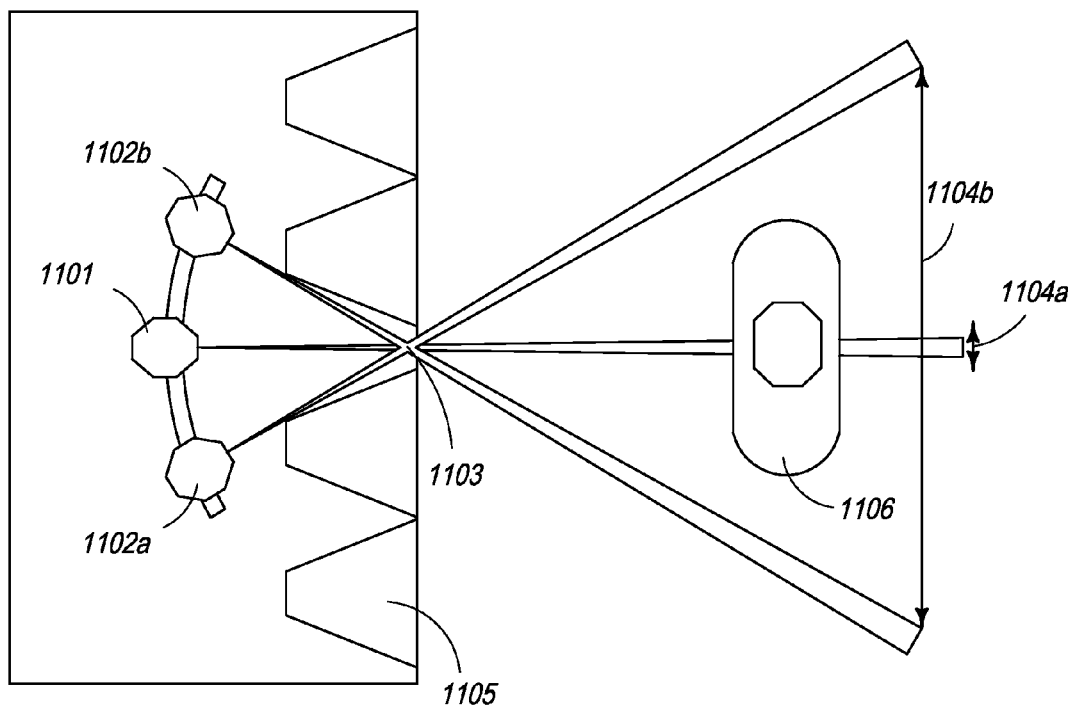

To overcome this limitation, the present invention, in one embodiment, employs a novel configuration illustrated in FIG. 11, which shows a top view of an exemplary scanning arrangement. Referring to FIG. 11, the single axis scanning source assembly 1101 is pivoted from point 1102a to 1102b, with a center of rotation 1103 at the front panel of the system. As can be seen from FIG. 11, 1104a is the view width available for the subject 1106, when the source 1101 is fixed, whereas 1104b is the view width available when the source is pivoting. Thus, the view width for a given source expands when it is pivoted. In this case, a larger number of detectors 1105 can be added to the system, thereby providing for an increased detection area. Further, a fixed rectangular opening is provided at the front panel, which also serves as an aperture keeping the focal spot very small in at least one axis. Further, with an optionally pivoting source as shown in FIG. 11, the same system can be employed to perform scans of targets when the person is in motion (and the source is not pivoting) or when the person is stationary (and the source is pivoting). With a stationary target, the image quality is nominally better than when a target is in motion because distortions are caused by differential velocity in the part of the moving subject (e.g., legs and arms). Thus under certain operational situations, the same system could perform a more detailed scan (with the target stationary) if an anomalous object is found on the first scan (when the target is in motion). The choice of system depends upon scanning requirements and is a trade-off between threat detection and high throughput.

As described above, in one embodiment, the detection system of the present invention is implemented as a walk-through detection system. The novel design of the system enables utilization of low-level radiation doses for detection of weapons and dangerous materials, regardless of whether they consist of metal, high-Z or low-Z materials. The radiation dose is in the range of less than 20 microrem, preferably less than 10 microrem, more preferably less than 5 microrem and even more preferably less than 1 microrem. This portal configuration can accommodate a high throughput of people as compared to conventional systems because each person being screened simply walks through the portal. Further, the person being screened does not need to stop and turn his or her body as directed by a scanner system operator. In addition, in using such a portal configuration through which the target walks, with its relatively confined area, is easier to combine with other walk-through devices, including metal detectors, drug and explosives sniffers, and video cameras.

Besides being employed for screening of passengers at airports and railway stations, at open and crowded venues such as stadiums and shopping malls, applications of the system of present invention may be extended to inspecting the contents of vehicles and containers at transit points such as ports, border crossings and customs checkpoints etc. In one embodiment, the detection system is implemented as a 'drive-through' system, through which a cargo vehicle to be scanned can be driven, thereby providing a second axis of motion. The detection system of the present invention may also be used for medical purposes.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive.

We claim:

1. A system for generating a two dimensional image of scattered radiation of a person, the system comprising:
   a first housing containing a first detection system configured to detect radiation scattered from the person;
   a second housing containing a second detection system configured to detect radiation scattered from the person; and
   a third tower containing an X-ray source assembly comprising an X-ray source, a spin-roll chopper and a motor, the third tower further having a front-end strip between an angled left side and an angled right side, and wherein the first housing and the second housing are detachably attached to the third housing so that the attachment abuts the first housing against the angled left side and abuts the second housing against the angled right side of the third tower, wherein the two dimensional image is generated from a dual-axis scanning beam, wherein a first axis of motion for the dual-axis scanning beam is provided by a walking movement of the person through an inspection area between the first and second housing and wherein a second axis of motion for the dual-axis scanning beam is provided by a fixed vertical scan beam of the X-ray source assembly.

2. The system of claim 1 wherein the scan beam emanates from an opening in the front-end strip.

3. The system of claim 1 wherein a variation of scanning beam power is enabled by varying at least one of a pitch, a roll or a width of a plurality of helical apertures formed on a hollow cylinder of the spin-roll chopper.

4. The system of claim 3 wherein the width of the plurality of helical apertures increases from portions away from the X-ray source to portions closer to the X-ray source.

5. The system of claim 3 wherein the plurality of helical apertures provide scan angles ranging from 60 degrees to 90 degrees by varying at least one of the following:
   a distance of the spin-roll chopper from the X-ray source and the person;
   a height of the hollow cylinder; and
   a diameter of the hollow cylinder.

6. The system of claim 3 wherein the plurality of helical apertures comprise at least two helical slits.

7. The system of claim 1 wherein the system is configured to conduct a plurality of predefined number of scans and enable a variation of scanning beam power from a plurality of first areas of the person to a plurality of second areas of the person and wherein the scanning beam power directed to the plurality of first areas is more relative to the scanning beam power directed to the plurality of second areas.

8. The system of claim 7, wherein the plurality of first areas are those that require more detail and resolution while the plurality of second areas are those that are sensitive to radiation.

9. The system of claim 1, wherein the motor rotates the spin-roll chopper to speeds up to 80K RPM.

10. The system of claim 1 wherein the spin-roll chopper enables both constant and variable linear scan beam velocity by controlling speed of rotation of the motor.

11. The system of claim 1 wherein a next person is scanned only after completing a predefined number of scans of the person.

12. A system for generating a two dimensional image of scattered radiation of a person from a dual-axis scanning beam and conducting a plurality of predefined number of scans of the person and enabling variation of scanning beam power from a plurality of first areas to a plurality of second areas of the person, the system having first and second scanning sides and comprising:

a first axis of motion for the dual-axis scanning beam provided by a walking movement of the person through an inspection area between the first and second scanning sides, wherein each of said first scanning side and second scanning side respectively comprises:

a first tower containing a first detection system configured to detect radiation scattered from the person;

a second tower containing a second detection system configured to detect radiation scattered from the person, wherein each of said first tower and second tower, respectively comprises:

a first housing defined by a first side, a second side and a third side that are connected to each other to form a polygonal cross-section;

a second housing proximate said third side of the first housing; and a third tower containing an X-ray source assembly comprising an X-ray source, a spin-roll chopper and a motor, the third tower further having a front-end strip between an angled left side and an angled right side, and wherein the first tower and the second tower are detachably attached to the third tower so that the attachment abuts the first tower against the angled left side and abuts the second tower against the angled right side of the third tower.

13. The system of claim 12 further comprising a second axis of motion for the dual-axis scanning beam provided by a fixed vertical scan beam of the X-ray source assembly, wherein the scan beam emanates from a small opening at the front-end strip, and wherein said variation of scanning beam power is enabled by varying at least one of a pitch, a roll or a width of a plurality of helical apertures formed on a hollow cylinder of the spin-roll chopper.

14. A system for generating a two dimensional image of scattered radiation of a person from a dual-axis scanning beam, the system having first and second scanning sides and comprising:

a first axis of motion for the dual-axis scanning beam provided by a walking movement of the person through an inspection area between the first and second scanning sides, wherein each of said first scanning side and second scanning side respectively comprises:

a first tower containing a first detection system configured to detect radiation scattered from the person;

a second tower containing a second detection system configured to detect radiation scattered from the person, wherein each of said first tower and second tower, respectively comprises:

a first housing defined by a first side, a second side and a third side that are connected to each other to form a triangular cross-section;

a second housing proximate said third side of the first housing;

a third tower containing an X-ray source assembly comprising an X-ray source, a spin-roll chopper and a motor, the third tower further having a front-end strip between an angled left side and an angled right side, and wherein the first tower and the second tower are detachably attached to the third tower so that the attachment abuts the first tower against the angled left side and abuts the second tower against the angled right side of the third tower; and a second axis of motion for the dual-axis scanning beam provided by a fixed vertical scan beam of the X-ray source assembly, wherein the scan beam emanates from a small opening at the front-end strip, and wherein said variation of scanning beam power is enabled by varying at least one of a pitch, a roll or a width of a plurality of helical apertures formed on a hollow cylinder of the spin-roll chopper.

\* \* \* \* \*